(12) United States Patent  
Kurosawa et al.

(10) Patent No.: US 7,111,313 B2  
(45) Date of Patent: Sep. 19, 2006

(54) DISK CARTRIDGE WITH SHUTTER REGULATOR, DISK DEVICE AND SHUTTER OPENING/CLOSING MECHANISM

(75) Inventors: Masashi Kurosawa, Tokorozawa (JP); Katsuhiro Onodera, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 8 days.

(21) Appl. No.: 10/244,537

(22) Filed: Sep. 17, 2002

(65) Prior Publication Data

US 2003/0058774 A1    Mar. 27, 2003

(30) Foreign Application Priority Data

Sep. 21, 2001   (JP)   ............................. 2001-289794

(51) Int. Cl.
*G11B 15/675* (2006.01)
*G11B 17/03* (2006.01)

(52) U.S. Cl. ...................................... 720/742; 720/740

(58) Field of Classification Search ............. 369/77.21, 369/291.1, 289.1, 289, 77.2, 272.1; 720/644, 720/738, 742, 600, 627, 629, 630, 643, 718, 720/725, 740, 737; 360/133

See application file for complete search history.

(56) References Cited

U.S. PATENT DOCUMENTS

| 3,755,641 | A | * | 8/1973 | Rackman | ................... | 200/52 R |
| 4,120,012 | A | * | 10/1978 | Bowers | ...................... | 360/133 |
| 4,608,617 | A | * | 8/1986 | Oishi et al. | .................. | 360/133 |
| 4,644,434 | A | * | 2/1987 | Oishi et al. | .................. | 360/133 |
| 4,682,322 | A |   | 7/1987 | Ohta | ......................... | 369/291 |
| 4,888,761 | A | * | 12/1989 | Ohta | ....................... | 369/291.1 |
| 5,995,346 | A | * | 11/1999 | Schick et al. | ............... | 360/133 |

FOREIGN PATENT DOCUMENTS

| DE | 3244797 A1 | * | 6/1983 |
| EP | 0 082 505 | | 6/1983 |
| EP | 1 156 488 | | 11/2001 |
| WO | WO 98/49684 | | 11/1998 |

OTHER PUBLICATIONS

European Search Report dated Jun. 23, 2003.

* cited by examiner

*Primary Examiner*—Julie Anne Watko
(74) *Attorney, Agent, or Firm*—Armstrong, Kratz, Quintos, Hanson & Brooks LLP

(57) ABSTRACT

A disk device 1 comprising a disk cartridge 3 and a disk 2 accommodated therein. The disk cartridge 3 includes a body case 11: opened with a window for exposing a recording surface 5 of the disk 2; and provided with a shutter 26 to be moved in a manner capable of opening/closing the window. The body case 11 is provided with: a rotating body 30 in a gear shape having an outer peripheral surface exposed to the exterior of the body case; and transmission 35 for transmitting the rotation of the rotating body 30 to the shutter 26. Provided in a disk driving apparatus for recording a piece of information into or reproducing the information from the disk 2 are: a guiding rib; and an operation rack along the disk inserting direction. Provided on an outer surface of the body case 11 is an operational-position determining groove. 17 in a recessed groove shape along the inserting direction of the disk device 1 and near the rotating body 30, and the rotating body 30 is engaged with the operation rack while engaging the groove 17 with the guiding rib so as to conduct the positioning, to thereby open/close the shutter 26.

9 Claims, 12 Drawing Sheets

DISK CARTRIDGE WITH SHUTTER REGULATOR, DISK DEVICE AND SHUTTER OPENING/CLOSING MECHANISM

BACKGROUND OF THE INVENTION

1. Field of the Invention

The present invention relates to: a disk cartridge capable of rotatably accommodating a disk therein and of being loaded in a disk driving apparatus for recording a piece of information into the disk and for reproducing the piece of information recorded in the disk; a disk device comprising such a disk cartridge and a disk accommodated therein; and a shutter opening/closing mechanism for opening/closing a shutter for opening/closing a window for exposing a disk by moving a shutter.

2. Description of Related Art

As conventional recording media, there have been widely utilized: disk cartridges removably accommodating disks therein such as CD-ROM's (Compact Disc Read Only Memory); and those disk devices such as MO (Magneto-Optical), FD (Floppy Disc: Trade Mark), MD (Mini Disk), which include disk cartridges integrally and rotatably accommodating disks therein. Known as these disk cartridges and disk devices are those having structures such as shown in FIGS. 11 and 12.

The structure shown in FIG. 11 is a disk device 105 comprising: a body case 102 rotatably accommodating a disk 101 therein, and formed with a window 103 for exposing a recording surface of the disk 101; and a shutter 104 moveably disposed on the body case so as to open/close the window. The shutter 104 of the disk device 105 is integrally provided with a belt 106 in the moving direction of the shutter, and this belt 106 has its tip end provided with a pawl portion 107. The shutter 104 for opening the window 103 is further provided with a coil spring 108 for influencing a counteracting force or pulling force onto the shutter 104 in a direction opposite to the moving direction thereof.

The disk device 105 shown in FIG. 11 is constituted such that this disk device 105 is inserted into a disk driving apparatus (not shown) for recording and reproducing a piece of information into and from the disk 101, such that the pawl portion 107 of the belt 106 is engaged by a pin 110 protruded within a zone through which the disk device 105 placed in a transferring path is moved when the disk device is transferred up to a predetermined operational position by transferring structure disposed in the disk driving apparatus. This moves the belt 106 against the pulling force of the coil spring 108 dependently of the transferring movement of the disk device 105, so that the shutter 104 is moved to open the window 103 to thereby expose the recording surface of the disk 101 at the operational position.

In the constitution shown in FIG. 11, the belt 106 is moved by engaging the pin 110 with the pawl portion 107 of the belt 106. Thus, by virtue of the side surface of the movement path through which the disk device 105 is moved to the operational position, there is restrictedly avoided such a situation that: the disk device 105 escapingly moves in a faraway direction from the pin 110 so that the pin 110 is disengaged from the pawl portion 107.

Meantime, the structure shown in FIG. 12 is a disk device 125 comprising: a body case 121 rotatably accommodating a disk (not shown) therein, and formed with a window 122 for exposing a recording surface of the disk; and a shutter 123 moveably disposed on the body case so as to open/close the window. The body case 121 of the disk device 125 is provided with a concaved portion 127 for forming a stepped portion between the shutter 123 and body case 121, within a moving region of the shutter 123 and in a state where the shutter 123 closes the window 122. Provided within the body case 121 is counteracting structure (not shown) for influencing a pulling force onto the shutter 123 in a direction opposite to the moving direction thereof for opening the window 122.

Provided in a disk driving apparatus (not shown) for recording and reproducing a piece of information into and from the recording surface of the disk of the disk device 125 are: an insertion opening for inserting the disk device 125 therethrough; an operational position communicated with the insertion opening so as to record/reproduce the information; and a movement path for moving the disk device 125 therethrough from the insertion opening toward the operational position. The disk driving apparatus is further provided with shutter driver 131 for opening/closing the shutter 123 of the disk device 125 which is moving through the movement path, to thereby open/close the window 122. This shutter driver 131 comprises: an arm portion 132 having one end rotatably disposed within the movement path, and the pivoted other end; a pin portion 133 disposed at the tip end or the one end of the arm portion 132, so as to engage in the concaved portion 127 of the disk device 125 which moves through the movement path; and a coil spring 135 for influencing a pulling force onto the arm portion 132 in a direction opposite to the rotating direction of the arm portion 132 which is rotated as the disk device 125 is moved to the operational position.

In the case where the disk device 125 is to be inserted into the insertion opening of the disk driving apparatus, the concaved portion 127 is engaged with the pin portion 133 of the shutter driver 131 positioned in the movement path, so that the arm portion 132 is rotated as the disk device 125 is moved. This rotational movement pushingly moves the shutter 123, so that the window 122 is opened at the operational position to thereby expose the recording surface of the disk.

In the constitution shown in FIG. 12, the pin portion 133 provided on the arm portion 132 of the shutter driver 131 engages with the shutter 123 from the concaved portion 127 to thereby move the shutter 123. Thus, by virtue of the side surface of the movement path through which the disk device 125 is moved to the operational position, there is restrictedly avoided such a situation that: the disk device 125 escapingly moves in a faraway direction from the pin portion 133 so that the pin portion 133 is disengaged from the shutter 123.

However, in the shutter opening/closing mechanism in the conventional disk device shown in FIG. 11 or FIG. 12, the side surface of the movement path for restricting the escaping movement of the disk device 105 or 125 is designed based on the dimension of the body case having a relatively large tolerance, thereby resulting in an increased wobble upon movement of the disk device 105 or 125. As such, the pin 110 may be disengaged from the pawl portion 107 to thereby fail to open/close the shutter 104 in the constitution shown in FIG. 11, while the pin portion 133 may be disengaged from the shutter 123 to thereby fail to open/close the shutter 123 in the constitution shown in FIG. 12.

SUMMARY OF THE INVENTION

It is therefore a main object of the present invention to provide a disk cartridge, a disk device and a shutter opening/closing mechanism, for assuredly opening/closing a shutter by a simple constitution.

The present invention provides a disk cartridge for rotatably accommodating therein a disk so as to be loaded into a disk driving apparatus for conducting at least one of operations for recording a piece of information in the disk and reproducing the information recorded in the disk, the disk cartridge comprising: a body case capable of rotatably accommodating the disk therein; a window opened in the body case so as to expose that surface of the accommodated disk which is to be recorded with the piece of information; a shutter provided in the body case in a manner capable of opening/closing the window; shutter driver moveably disposed within the body case so as to be contacted with and moved by the disk driving apparatus in a state where the disk cartridge is leaded in the disk driving apparatus or in the course of loading movement of the disk cartridge into the disk driving apparatus, so as to move the shutter to thereby open/close the window; and engaging structure provided in a convex or concave shape on an outer surface of the body case so as to engage with seizing structure provided in a concave or convex shape on the disk driving apparatus, at least while the shutter driver contacts with the disk driving apparatus.

According to such a constitution, the body case capable of rotatably accommodating the disk therein is: opened with the window for exposing that surface of the accommodated disk which is to be recorded with the piece of information; and provided with the shutter provided in the manner capable of opening/closing the window. The shutter driver disposed within the body case is contacted with the disk driving apparatus so as to move the shutter to thereby open/close the window, in the state where the disk cartridge is loaded in the disk driving apparatus or in the course of loading movement of the disk cartridge into the disk driving apparatus for recording a piece of information into the disk or reproducing the information from the disk. When the shutter driver contacts with the disk driving apparatus, the engaging structure provided in the convex or concave shape on the outer surface of the body case is engaged with the seizing structure provided in the concave or convex shape on the disk driving apparatus, to thereby position the body case. Thus, the distance between the contacting portion of the disk driving apparatus and the location of the engaging structure for positioning becomes shorter as compared with the situation where the body case is positioned in the conventional widthwise manner, thereby allowing to reduce wobble to be otherwise caused by dimensional errors. This allows to prevent the body case from escapingly moving in a faraway direction from the contacting portion of the disk driving apparatus by virtue of the simple concave and convex constitution, to thereby reliably ensure the contact between the shutter driver and the disk driving apparatus, thereby allowing to obtain. reliable opening/closing of the shutter.

The present invention further provides a disk cartridge for rotatably accommodating therein a disk so as to be loaded into a disk driving apparatus for conducting at least one of operations for recording a piece of information into the disk and reproducing the information recorded in the disk, the disk cartridge comprising: a body case capable of rotatably accommodating the disk therein; a window opened in the body case so as to expose that surface of the accommodated disk which is to be recorded with the piece of information; a shutter provided in the body case in a manner capable of opening/closing the window; shutter driver moveably disposed within the body case so as to be contacted with and moved by the disk driving apparatus in a state where the disk cartridge is loaded in the disk driving apparatus or in the course of loading movement of the disk cartridge into the disk driving apparatus, so as to move the shutter to thereby open/close the window; and engaging structure provided on an outer surface of the body case and near the shutter driver so as to engage with the disk driving apparatus, at least while the shutter driver contacts with the disk driving apparatus.

According to such a constitution, the body case capable of rotatably accommodating the disk therein is: opened with the window for exposing that surface of the accommodated disk which is to be recorded with the piece of information; and provided with the shutter provided in the manner capable of opening/closing the window. The shutter driver disposed within the body case is contacted with the disk driving apparatus so as to move the shutter to thereby open/close the window, in the state where the disk cartridge is loaded in the disk driving apparatus or in the course of loading movement of the disk cartridge into the disk driving apparatus for recording a piece of information into the disk or reproducing the information from the disk. When the shutter driver contacts with the disk driving apparatus, the engaging structure provided on the body case and near the shutter driver is engaged with the disk driving apparatus to thereby position the body case. Thus, the engaging structure, near the shutter driver contacted by the disk driving apparatus to thereby open/close the shutter, positions the body case to thereby prevent the body case from escapingly moving in a faraway direction from the contacting portion of the disk driving apparatus. This allows to shorten the distance between the contacting portion of the disk driving apparatus and the engaging structure for positioning, to thereby reduce wobble to be otherwise caused by dimensional errors., so that the contact between the shutter driver and the disk driving apparatus can be reliably ensured, thereby allowing to obtain reliable opening/closing of the shutter.

In the disk cartridge of the present invention, it is desirable that the engaging structure is formed in a concave shape to be disengageably engaged by seizing structure protrudedly provided in a convex shape on the disk driving apparatus.

According to such a constitution, the engaging structure is formed in the concave shape to be disengageably engaged by seizing structure protrudedly provided in the convex shape on the disk driving apparatus. This improves the operability of the disk cartridge with a simple constitution having no projections from the outer surface.

In the disk cartridge of the present invention, it is desirable that the shutter driver contacts with the disk driving apparatus to thereby move the shutter in the course of loading movement of the disk cartridge into the disk driving apparatus; and that the engaging structure is formed in a recessed groove shape along the moving direction of the disk cartridge in the course of loading movement of the disk cartridge into the disk driving apparatus, in a manner engageable with seizing structure protruded in that moving region of the disk driving apparatus which the body case is moved along.

According to such a constitution, the engaging structure is formed in the recessed groove shape along the moving direction of the disk cartridge in the course of loading movement of the disk cartridge into the disk driving apparatus, and is positioned by engaging with the seizing structure protruded in that moving region of the disk driving apparatus which the body case is moved along, so that the shutter driver is contacted) with the disk driving apparatus to thereby move the shutter in the course of loading movement of the disk cartridge into the disk driving apparatus. Thus, the constitution of the shutter driver for moving the shutter with the loading movement of the disk cartridge into the disk driving apparatus can be provided by a simple constitution for contacting with the disk driving apparatus. The contacting state between the disk driving apparatus and the shutter driver for moving the shutter by the simple constitution is maintained by the engaging structure of the simple constitution in the recessed groove shape during the loading movement, thereby enabling to assuredly open/close the shutter even by the constitution for moving the shutter during the movement of the disk cartridge.

In the disk cartridge of the present invention, it is desirable that the disk cartridge further comprises: shutter regulator disposed within the body case, so as to restrict the movement of the shutter by disengageably engaging with at least one of the shutter driver and the shutter, and so as to be released from the engagement with the at least one of the shutter driver and the shutter by being contacted by the disk driving apparatus while the shutter driver contacts with the disk driving apparatus.

According to such a constitution the shutter regulator disposed within the body case restricts the movement of the shutter by disengageably engaging with at least one of the shutter driver and the shutter, and is released from the above engagement by being contacted by the disk driving apparatus to thereby allow the shutter to move while the shutter driver contacts with the disk driving apparatus. This assuredly avoids such a situation that: the shutter is inadvertently moved and the disk is exposed from the opened window so that the disk is damaged.

The present invention further provides a disk device comprising: the aforementioned disk cartridge, and a disk rotatably accommodated within the disk cartridge.

According to such a constitution, there is provided such a disk cartridge recited in anyone of claims 1 through 4 where the contact between the shutter driver and the disk driving apparatus is reliably ensured to thereby obtain reliable opening/closing of the shutter, thereby allowing to obtain excellent opening/closing of the shutter and a stable quality.

The present invention further provides a shutter opening/closing mechanism for opening/closing a shutter of a disk cartridge, the disk cartridge comprising: a body case accommodating a disk therein or capable of rotatably accommodating a disk therein; a window opened in the body case so as to expose that surface of the accommodated disk which is to be recorded with a piece of information; and the shutter provided in the body case in a manner capable of opening/closing the window; the shutter opening/closing mechanism comprising: shutter driver moveably disposed within the body case so as to move the shutter to thereby open/close the window, by being contacted with and moved by a disk driving apparatus for conducting at least one of operations for recording a piece of information into the disk and reproducing the information recorded in the disk, in a state where the disk cartridge is loaded in the disk driving apparatus or in the course of loading movement of the disk cartridge into the disk driving apparatus; engaging structure provided in a convex or concave shape on an outer surface of the body case; and seizing structure provided in a concave or convex shape in the disk driving apparatus so as to be engaged with the engaging structure while the shutter driver contacts with the disk driving apparatus.

According to such a constitution, the engaging structure is provided in the convex or concave shape on the outer surface of the body case, and the engaging structure is engaged with the seizing structure provided in the disk driving apparatus for recording/reproducing a piece of information to thereby position the body case, while the shutter driver for moving the shutter contacts with the disk driving apparatus. Thus, the distance between the contacting portion of the disk driving apparatus and the location of the engaging structure for positioning becomes shorter as compared with the situation where the body case is positioned in the conventional widthwise manner, thereby allowing to reduce wobble to be otherwise caused by dimensional errors. This allows to prevent the body case from escapingly moving in a faraway direction from the contacting portion of the disk driving apparatus by virtue of the simple concave and convex constitution, to thereby reliably ensure the contact between the shutter driver and the disk driving apparatus, thereby allowing to obtain reliable opening/closing of the shutter.

The present invention provides a shutter opening/closing mechanism for opening/closing a shutter of a disk cartridge, the disk cartridge comprising: a body case accommodating a disk therein or capable of rotatably accommodating a disk therein; a window opened in the body case so as to expose that surface of the accommodated disk which is to be recorded with a piece of information; and the shutter provided in the body case in a manner capable of opening/closing the window; the shutter opening/closing mechanism comprising: shutter driver moveably disposed within the body case so as to move the shutter to thereby open/close the window, by being contacted with and moved by a disk driving apparatus for conducting at least one of operations for recording a piece of information into the disk and reproducing the information recorded in the disk, in a state where the disk cartridge is loaded in the disk driving apparatus or in the course of loading movement of the disk cartridge into the disk driving apparatus; engaging structure provided on an outer surface of the body case, adjacent to the shutter driver; and seizing structure provided in the disk driving apparatus so as to be engaged with the engaging structure while the shutter driver contacts with the disk driving apparatus.

According to such a constitution, the engaging structure is provided on the outer surface of the body case, adjacent to the shutter driver for opening/closing the window for exposing the disk rotatably accommodated within the body case, and this engaging structure is engaged with the seizing structure provided in the disk driving apparatus for recording/reproducing a piece of information to thereby position the body case, while the shutter driver for moving the shutter contacts with the disk driving apparatus. Thus, the distance between the contacting portion of the disk driving apparatus and the location of the engaging structure for positioning becomes shorter, thereby allowing to reduce wobble to be otherwise caused by dimensional errors. This allows to reliably ensure the contact between the shutter driver and the disk driving apparatus, thereby allowing to obtain reliable opening/closing of the shutter.

In the shutter opening/closing mechanism of the present invention, it is desirable that the seizing structure is protrudedly formed in a convex shape; and the engaging structure is formed in a concave shape to be disengageably engaged by the seizing structure.

According to such a constitution, the engaging structure is formed in the concave shape to be disengageably engaged by the seizing structure protrudedly formed in the convex shape. This improves the operability of the disk cartridge with a simple constitution having no projections from the outer surface.

In the shutter opening/closing mechanism of the present invention, it is desirable that the shutter driver contacts with the disk driving apparatus to thereby move the shutter in the course of loading movement of the disk cartridge into the disk driving apparatus; that the seizing structure is protruded in a convex shape in that moving region of the disk driving apparatus which the body case is moved along; and that the engaging structure is formed in a recessed groove shape along the moving direction of the disk cartridge in the course of loading movement of the disk cartridge into the disk driving apparatus, in at manner being disengageably engaged by the seizing structure.

According to such a constitution, the engaging structure is formed in the recessed groove shape along the moving direction of the disk cartridge in the course of loading movement of the disk cartridge into the disk driving apparatus, and is positioned by engaging with the seizing structure protruded in that moving region of the disk driving apparatus which the body case is moved along, so that the shutter driver is contacted with the disk driving apparatus to thereby move the shutter in the course of loading movement of the disk cartridge into the disk driving apparatus. Thus, the constitution of the shutter driver for moving the shutter with the loading movement of the disk cartridge into the disk driving apparatus can be provided by a simple constitution for contacting with the disk driving apparatus. The contacting state between the disk driving apparatus and the shutter driver for moving the shutter by the simple constitution is maintained by the engaging structure of the simple constitution in the recessed groove shape during the loading movement, thereby enabling to assuredly open close the shutter even by the constitution for moving the shutter during the movement of the disk cartridge.

In the shutter opening/closing mechanism of the present invention, it is desirable that the shutter opening/closing mechanism further comprises: shutter regulator disposed within the body case, so as to restrict the movement of the shutter by disengageably engaging with at least one of the shutter driver and the shutter, and so as to be released from the engagement with the at least one of the shutter driver and the shutter by being contacted by the disk driving apparatus while the shutter driver contacts with the disk driving apparatus.

According to such a constitution, the shutter regulator disposed within the body case restricts the movement of the shutter by disengageably engaging with at least one of the shutter driver and the shutter, and is released from the above engagement by being contacted by the disk driving apparatus to thereby allow the shutter to move while the shutter driver contacts with the disk driving apparatus. This assuredly avoids such a situation that: the shutter is inadvertently moved and the disk is exposed from the opened window so that the disk is damaged.

BRIEF DESCRIPTION OF THE DRAWINGS

FIGS. 4(A) and 4(*b*) are plan views showing a state where the disk device is loaded into the disk driving apparatus, in which FIG. 4(A) shows a state where the disk device is inserted into the disk driving apparatus.

FIG. 6(A–C) is an explanatory view showing a rotation restricted state of a rotating body by rotation regulator, in which

FIGS. 7(A) and 7(B) are plan views showing a state for loading the disk device into another disk driving apparatus, in which FIG. 7(A) shows a state where the disk device is inserted into the disk driving apparatus, and FIG. 7(B) shows a state where the window of the loaded disk device is opened;

DETAILED DESCRIPTION OF THE PREFERRED EMBODIMENT(S)

There will be described hereinafter an embodiment of the present invention, with reference to the accompanying drawings.

[Structure of Disk Device]

Figure 1:
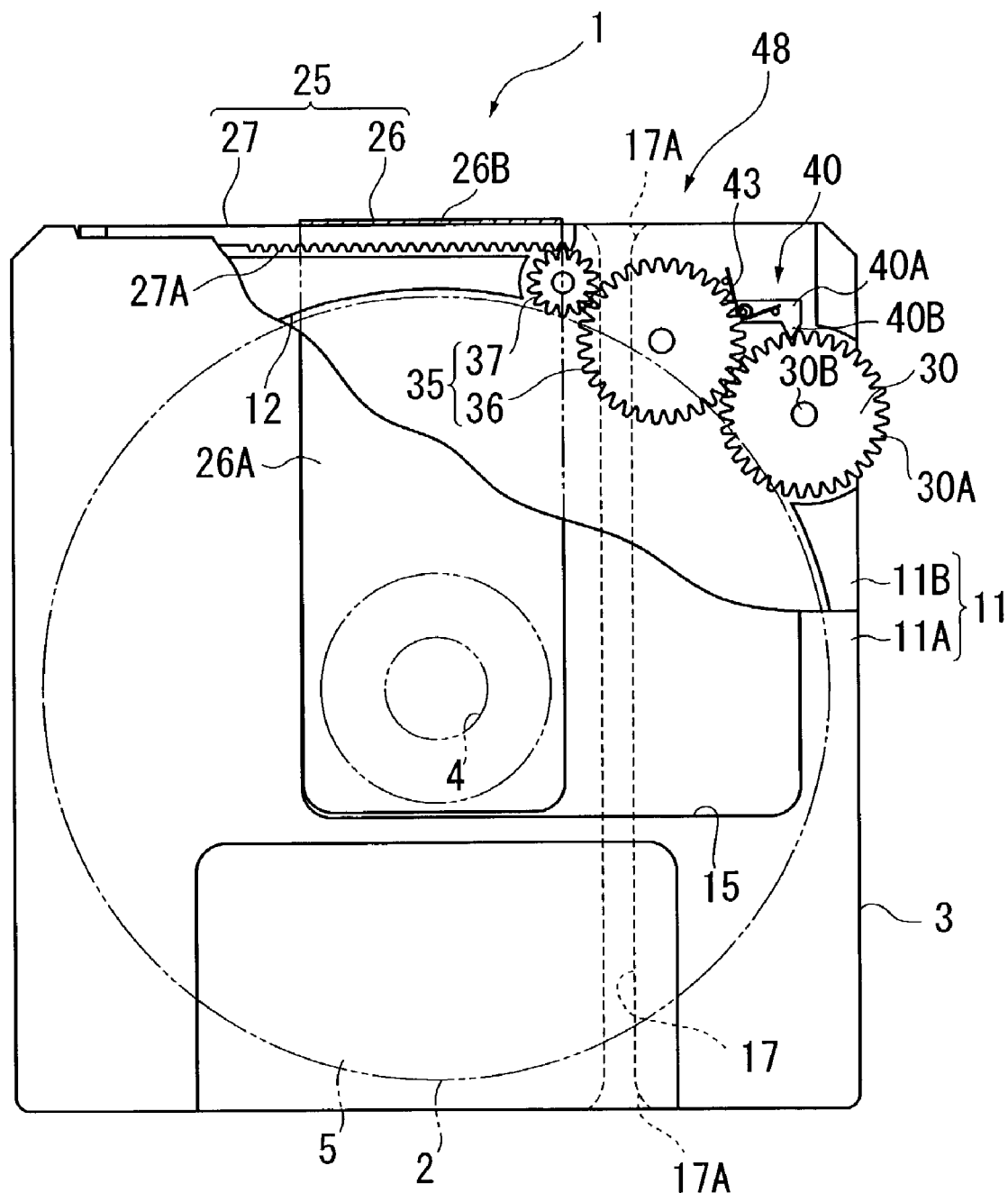
FIG. 1 is a plan view showing a partially cut-away constitution of a disk device according to an embodiment of the present invention.
Figure 2:
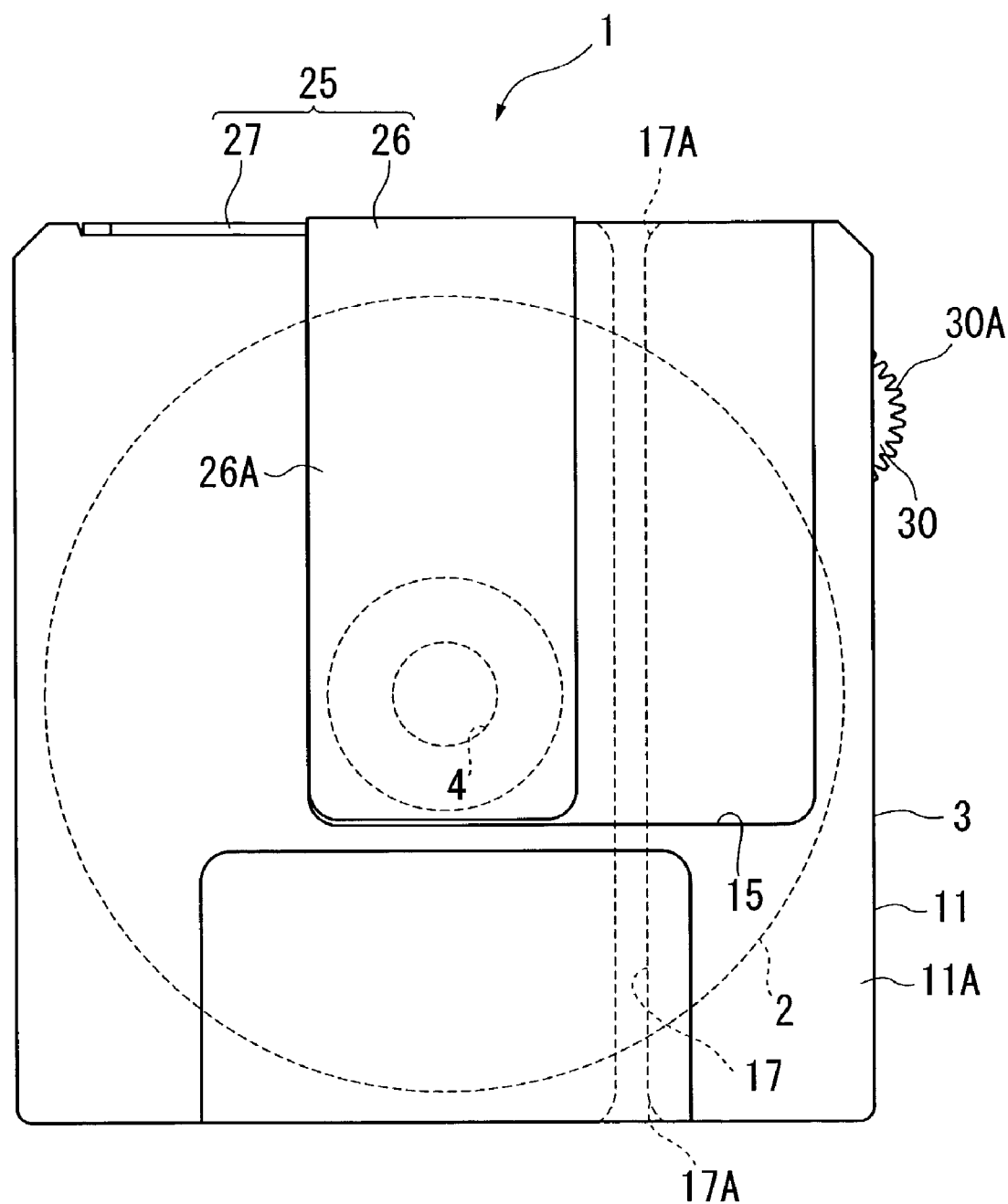
FIG. 2 is a plan view showing the disk device.
Figure 3:
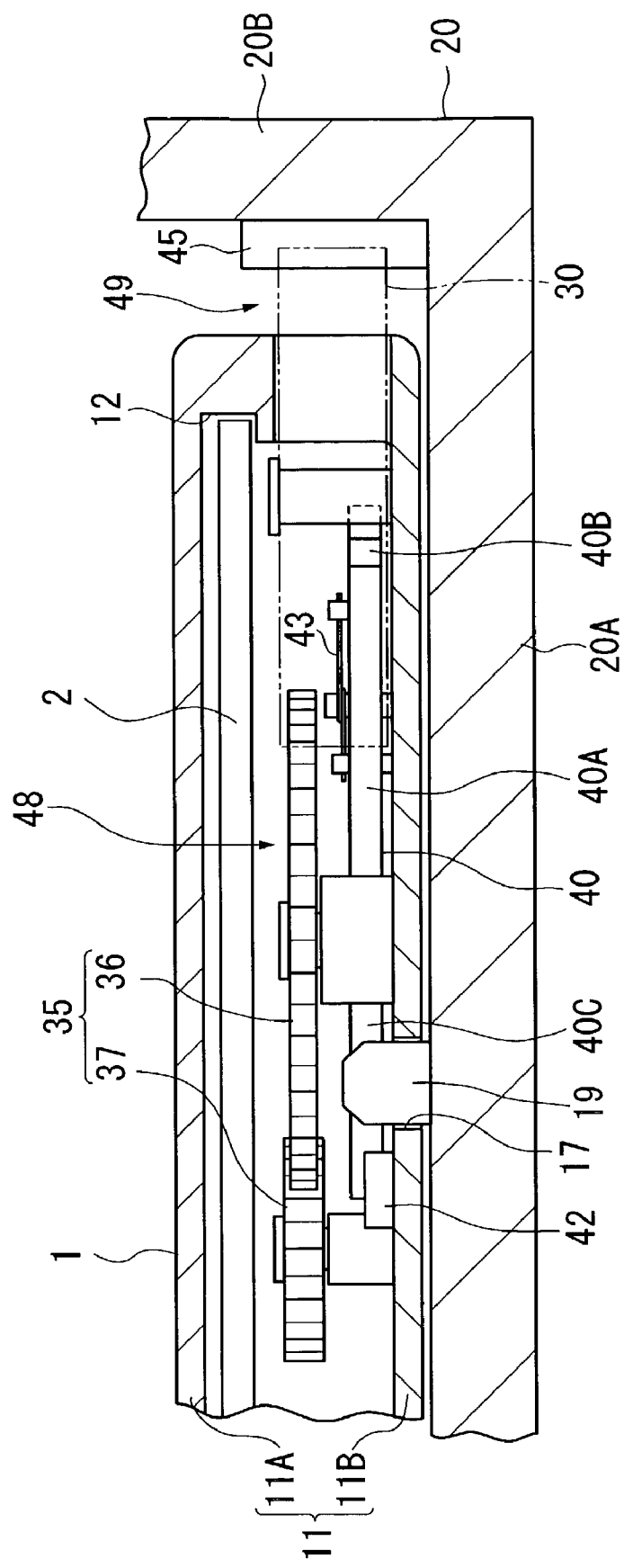
FIG. 3 is a cross-sectional view showing a state where the disk device is loaded into a disk driving apparatus.
Figure 4A:
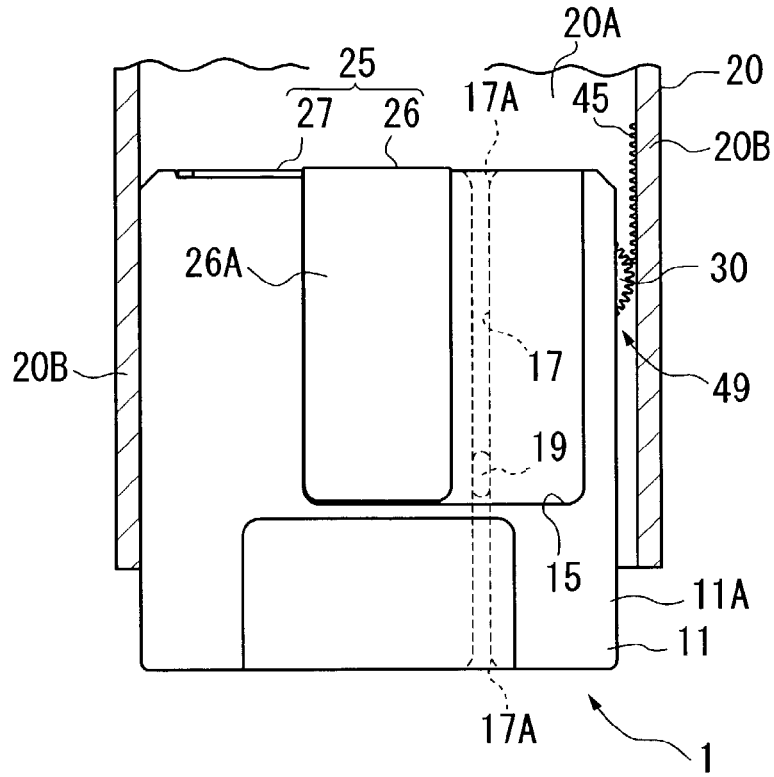
Figure 4B:
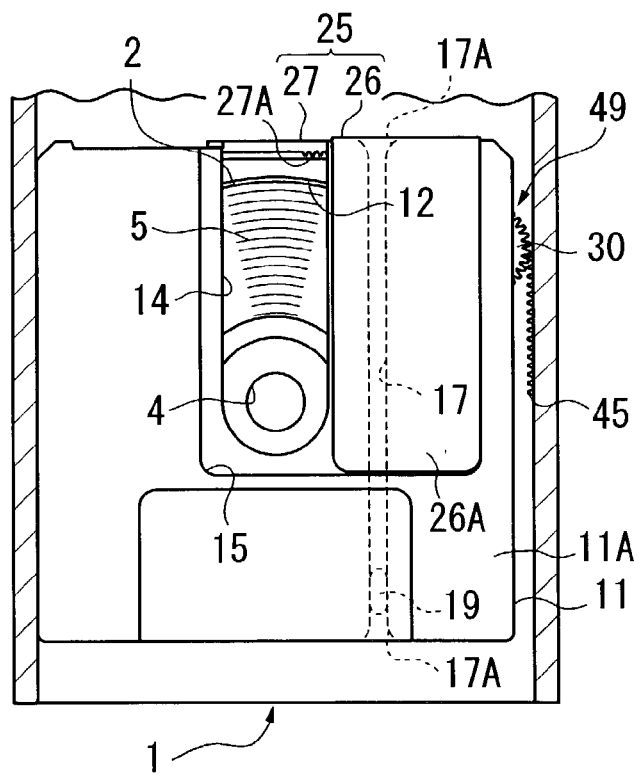
FIG. 4(B) shows a state where the window of the loaded disk device is opened.
Figure 5:
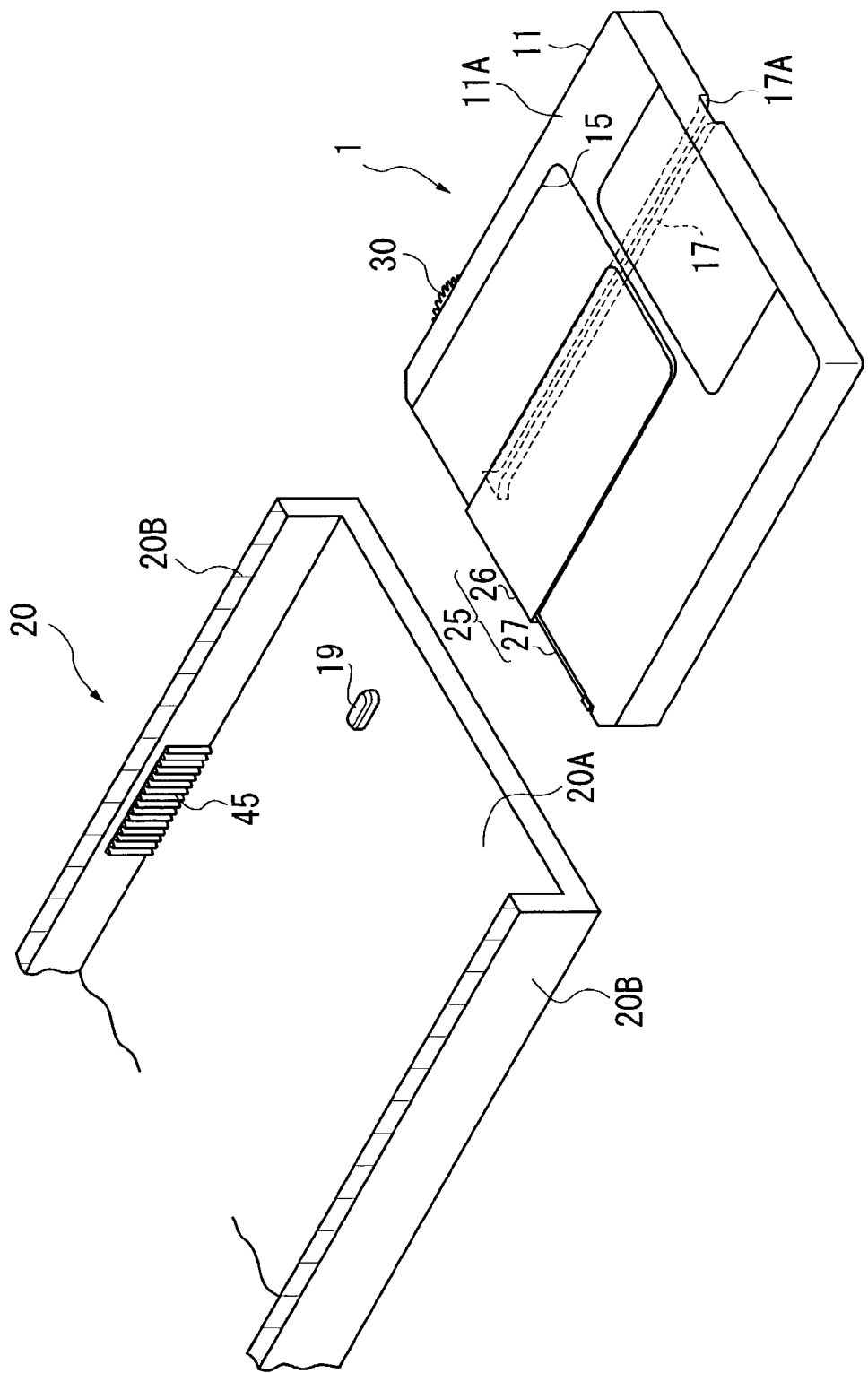
FIG. 5 is a perspective view showing a state where the disk device is about to be loaded into the disk driving apparatus.
Figure 6A:
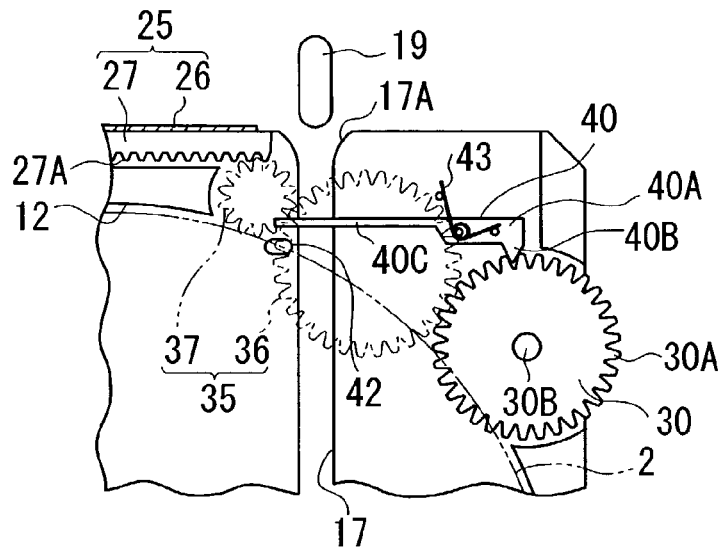
FIG. 6(A) shows the rotation restricted state of the rotating body.
Figure 6B:
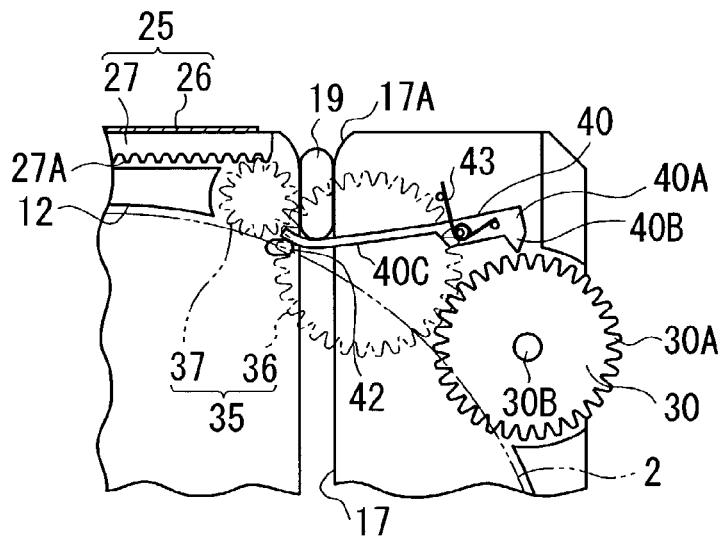
FIG. 6(B) shows a state terminating the rotation restriction.
Figure 6C:
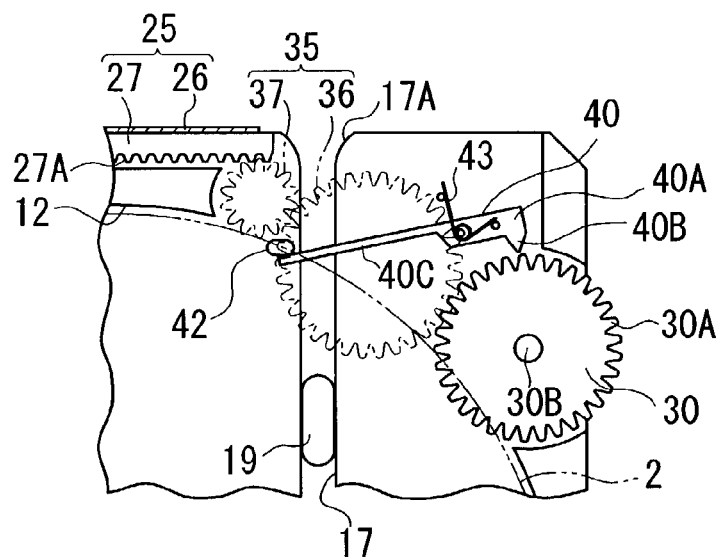
FIG. 6(C) shows a state having terminated the rotation restriction.

FIG. 1 is a plan view showing a partially cut-away disk device according to an embodiment of the present invention. FIG. 2 is a plan view showing the disk device. FIG. 3 is a partially cut-away cross-sectional view showing the disk device in a state where it is loaded into a disk driving apparatus. FIGS. 4(A) and 4(B) are explanatory views for explaining an opening/closing situation of a shutter, in which FIG. 4(A) is an explanatory view explaining a state just before opening a window, and FIG. 4(B) shows a state where the window is opened. FIG. 5 is a perspective view for explaining a situation where the disk device is about to be loaded into the disk driving apparatus. FIG. 6 is an explanatory view showing a rotation restricted state of a rotating body, in which FIG. 6(A) shows a state where the rotation of the rotating body is restricted, FIG. 6(B) shows a state where the rotation restriction of the rotating body is terminated when inserted into the disk driving apparatus, and FIG. 6(C) shows a state where the termination of rotation restriction of the rotating body is maintained.

FIGS. 1 through 3 show a disk device 1 comprising: a disk 2; and a disk cartridge 3 rotatably accommodating the disk 2 therein. Used as the disk 2 is an optical disk, magnetic disk or magnet-optical disk capable of optically or magnetically recording or recorded with a piece of information, such as DVD (Digital Versatile Disk) and CD-ROM (Compact Disc Read Only Memory). The disk 2 is in a substantially circular shape farmed with a substantially circular axial hole 4 in a substantially center position of the disk, and is provided with a recording surface 5 to be recorded with or already recorded with a piece of information on one or both of the surfaces of the disk. This embodiment is also applicable to those disks each having only one-sided recording surface 5.

Meanwhile, the disk cartridge 3 includes a body case 11 made of a synthetic resin. This body case 11 includes: an obverse-side case 11A of a substantially flat box shape which opens at its one side such as the back surface side; and a reverse-side case 11B of a substantially flat box shape which opens at its one side such as the obverse surface side so as to close the back surface side opening of the obverse-side case 11A. Defined within the body case 11 by joining the obverse-side case 11A and reverse-side case 11B is a disk chamber 12 capable of rotatably accommodating the disk 2 therein.

Further, as shown in FIG. 4(B), the body case 11 is opened with windows 14. These windows 14 are formed in substantially the same shapes so as to open at positions such as corresponding to the obverse-side case 11A and reverse-side case 11B, respectively. Each window 14 is in a substantially rectangular shape opened to expose the disk 2 accommodated within the disk chamber 12 in an area from the outer periphery of the disk 2 toward the periphery of the central axial hole 4 of the disk 2, and is opened over a region from the substantial center of the body case 11 toward the midsection of one edge portion of the body case. Further, the obverse surface and reverse surface of the body case 11 are provided with sliding recesses 15 in substantially rectangular recessed shapes, respectively, over a region from the substantial center including the window 14 toward the one side edge of the body case.

The windows 14 may have appropriate shapes such that: each window has as size to expose only the portion of the recording surface 5 of the disk 2 such as in an MD (Mini Disk); only one window is opened in that surface of the body case 11 which opposes to the recording surface 5 disposed at only one surface of the disk 2; or one and the other windows are in the shapes opened to expose only the recording surface 5 on one surface side and to expose an region from the vicinity of the axial hole 4 toward the recording; surface 5 on the other surface side, respectively. In the situation where only the recording surface 5 is exposed, the body case 11 is to be provided with a hole so as to rotatingly drive the disk 2 by bringing the periphery of the axial hole 4 of the disk 2 into a state exposed to the exterior.

As shown in FIGS. 1 through 6(C), on the outer surface at the reverse surface of the reverse-side case 11B, the body case 11 is provided with an operational-position determining groove 17 as engaging structure over a region from one edge side of the body case 11 where the window 14 is opened toward the opposing other edge side of the body case. This operational-position determining groove 17 is provided with guiding portions 17A in the states outwardly spreading at the one edge portion and other edge portion of the body case 11, respectively. As shown in FIG. 3, this operational-position determining groove 17 is formed in an opened state continued into the interior of the body case 11.

As shown in FIGS. 3 through 6(C) the operational-position determining groove 17 is engaged in a slidable and disengageable manner with a guiding rib 19 as seizing structure disposed in a disk driving apparatus (not shown) for loading the disk device 1 therein so as to record a piece of information into and reproduce a piece of recorded information from the disk 2. This guiding rib 19 is disposed on a movement guiding member 20 disposed in the disk driving apparatus so as to constitute a movement path for transferring and moving therethrough the disk device 1 inserted via insertion opening (not shown). This movement guiding member 20 is formed to have a substantially channel shaped cross section to include: a carrying plate 20A for carrying the disk device 1 thereon; and a pair of guiding rails 20B opposing to each other at substantially the same width dimension as the maximum width dimension of the disk device 1 so as to allow the disk device 1 to move between the guiding rails. The guiding rib 19 is protruded into a longitudinal rib shape in the direction for moving the disk device 1, at the position on the carrying plate 20A of the movement guiding member 20 and closer to the insertion opening. The guiding rib 19 is formed into a so-called tapered or converged shape having a tip end of a smaller diameter by chamfering both tip ends and both longitudinal edges of the guiding rib, and in a substantially ellipse shape in a plan view.

As shown in FIGS. 1, 2, 4 and 5, the body case 11 is provided with a shutter body 25 in a moveable manner. This shutter body 25 exemplarily comprises: a shutter 26 made of metal such as an aluminum alloy or made of a synthetic resin; and a shutter rack 27 provided integrally with the shutter 26.

The shutter 26 is formed into a substantially deep channel shaped cross section to include: a pair of cover plate portions 26A; and a coupling plate portion 26B for integrally and continuously coupling these cover plate portions 26A. Each cover plate portion 26A is formed into a rectangular shape adapted to be moveably positioned within the sliding recess 15 so as to cover substantially half the surface of the sliding recess 15 to thereby close the window 14. The coupling plate portion 26B integrally and continuously joins longitudinal one ends of the cover plate portions 26A together. The shutter 26 is provided to straddle the body case 11 from the sliding recess 15 of the obverse-side case 11A to the sliding recess 15 of the reverse-side case 11B.

The shutter rack 27 is formed into an elongated rod shape by the coupling plate portion 26B. This shutter rack 27 is provided integrally with the coupling plate portion 26B, in a manner extended into a direction opposite to the direction through which the shutter 26 is moved within the sliding recess 15, in a state where the shutter 26 closes the window 14. There is provided a rack 27A on the longitudinal one surface of the shutter rack 27, i.e., on that surface of the shutter rack 27 facing to the disk chamber 12 of the body case 11, opposite to the surface of the shutter rack 27 joined to the coupling plate portion 26B. Provided at both ends of the shutter rack 27 are sliding pawl portions (not shown) protruded from those side surfaces of the shutter rack which face to the cover plate portions 26A, respectively. These sliding pawl portions are to prevent the shutter body 25 from falling from the body case 11, by engaging with concave sliding groove portions (not shown) of the body case 11 along the moving direction of the shutter 26.

The shape of the shutter 26 is not limited to the substantially channel shaped cross section, and its design may be appropriately modified into any shape in a manner capable of opening/closing the window 14. Similarly, the structure of the shutter body 25 is not to limited to be constituted of the shutter 26 and shutter rack 27, and its design may be appropriately modified.

As shown in FIGS. 1 through 6(C) rotatably provided within the body case 11 is a rotating body 30. This rotating body 30 is in a disc gear shape provided with gear teeth 30A along the outer periphery of the rotating body. This rotating body 30 is provided in a rotatable manner by means of a rotation shaft 30B disposed at the center of the rotating body 30, in a state where the rotating body 30 is placed that one corner of the body case 11 which is deviated from the substantially circular disk chamber 12 such that the gear teeth 30A at the outer periphery are exposed from the outer surface of the body case 11. The rotation shaft 30B for pivoting the rotating body 30 includes any constitution for rotatably pivoting the rotating body 30 to the body case 11, such that the rotation shaft 30B is integrally protruded from the body case 11 to thereby rotatably pivot the rotating body 30, or the rotation shaft 30B is provided integrally with the rotating body 30 so as to be rotatably supported by the body case 11.

Provided within the body case 11 is transmission 35 at a position near the rotating body 30. This transmission 35 is disposed near the rotating body 30 and comprises: a first pinion 36 engaged with the rotating body 30; and a second pinion 37 engaged with the first pinion 36 and with the rack 27A of the shutter rack 27. This transmission 35 is to move the shutter body 25 provided with the shutter rack 27 engaged with the second pinion 37, by rotating the first pinion 36 in the direction opposite to the rotating body 30 and by rotating the second pinion 37 in the same direction as the rotating body 30, when the rotating body 30 is rotated. Note, these first pinion 36 and second pinion 37 may be rotatably pivoted in the same manner as the rotating body 30 by any means.

As shown in FIGS. 1, 3 through 6(A–C), provided within the body case 11 and near the rotating body 30 is rotation regulator 40 for restricting the rotation of the rotating body 30. This rotation regulator 40 is exemplarily formed of an elastically deformable synthetic. resin, and includes a body part 40A in a rectangular column shape. This body part 40A has its longitudinal one end rotatable in the direction to contact with and depart from the outer periphery of the rotating body 30, by pivoting the other end of the body part 40A to the body case 11. This pivotable supporting may be achieved in the same manner as the rotating body 30 by any means.

Protruded from the surface of the axial one end portion of the body part 40A is a rotation restricting pawl portion 40B for opposing to the outer peripheral surface of the rotating body 30. This rotation restricting pawl portion 40B is formed into a substantially wedge shape in a manner engageable with and disengageable from the gear teeth 30A at the outer peripheral surface of the rotating body 30.

Provided at the axial other end of the body part 40A of the rotation regulator 40 is an elongated rotation restricting portion 40C along the axial direction. This rotation restricting portion 40C is provided in a state where the tip end portion of the rotation restricting portion 40C abuts on a positioning convex portion 42 protruded within the body case 11 at a position opposite to the position where the rotation regulator 40 is rotatably provided, with respect to the operational-position determining groove 17. As shown in FIG. 6, this rotation restricting portion 40C is formed to be capable of striding over the positioning convex portion 42 by elastically deforming in itself by abutting onto the guiding rib 19 disposed in the disk driving apparatus in a state where the rotation restricting portion 40C abuts on the positioning convex portion 42. Note, this rotation restricting portion 40C may be constituted of a member separate from the body part 40A such that only the rotation restricting portion 40C is formed of an elastically deformable member integrally attached to the body part 40A.

The rotation regulator 40 is provided with a torsion coil spring 43 as urging structure for urging the rotation restricting pawl portion 40B in a direction for normally engaging with the rotating body 30. The rotation regulator is not limited to the torsion coil spring 43, and may be exemplarily constituted of any elastic member such as a leaf spring or rubber for urging the rotation restricting pawl portion 40B of the rotation regulator 40 in a direction for normally engaging with the rotating body 30.

This rotation regulator 40 is constituted such that the rotation restricting pawl portion 40B thereof is engaged with the gear teeth 30A at the outer peripheral surface of the rotating body 30 to thereby restrict the rotation of the rotating body 30 in a normal state by the restoring force comprising the urging force of the torsion coil spring 43 as shown in FIG. 6(A) such that the shutter 26 of the shutter body 25 closes the window 14 as shown in FIG. 4(A).

Upon loading the disk device 1 into the disk driving apparatus, the guiding rib 19 engages with the operational-position determining groove 17 and relatively moves within the operational-position determining groove 17 as the disk device 1 moves, thereby rendering the rotation restricting portion 40C to abut onto the positioning convex portion 42. Further movement of the disk device 1 causes the rotation regulator 40 to elastically deform as shown in FIG. 6(B) and then to stride over the positioning convex portion 42. In this state, the rotating body 30 falls into a state for engaging with an operation rack 45 acting as rotating structure disposed on the guiding rail 20B of the movement guiding member 20 of the disk driving apparatus along the moving direction of the disk device 1 shown in FIG. 4(A).

Further movement of the disk device 1 causes the guiding rib 19 to pass through the rotation restricting portion 40C and then causes the rotation regulator 40 to be rotated by the restoring force of the torsion coil spring 43, as shown in FIG. 6(C). In this state, the rotation restricting portion 40C again abuts onto the positioning convex portion 42, so that the rotation restricting pawl portion 40B is held, without engaging with the rotating body 30, in a state of a free rotation of the rotating body 30, i.e., in a state where the rotating body 30 is rotated by the operation rack 45 as the rotating body 30 moves. These shutter rack 27, rotating body 30 and transmission 35 cooperatively constitute shutter driver 48, and this shutter driver 48 and the operation rack 45 as the rotating structure cooperatively constitute a shutter opening/closing mechanism 49.

[Operation of Disk Device]

There will be explained hereinafter the operation of the disk device 1 of the above embodiment.

As shown in FIGS. 1 and 2, the disk device 1 is positioned in a state where the shutter 26 of the shutter body 25 closes the window 14, in a normal unused state. In this state, the rotation restricting pawl portion 40B of the rotation regulator 40 engages with the gear teeth 30A at the outer peripheral surface of the rotating body 30 by the restoring force of the torsion coil spring 43 as shown in FIG. 6(A), to thereby restrict the rotation of the rotating body 30 such that the rotating body 30 is not rotated even by an action onto the rotating body 30 from the exterior. This avoids such a situation that the shutter body 25 is inadvertently moved to open the window 14 to thereby expose the recording surface 5 of the disk 2.

Upon using the disk device 1, i.e., upon recording a piece of information into or reproducing the recorded information from the disk 2 by the disk driving apparatus, the disk device 1 is inserted into the insertion opening (not shown) of the disk driving apparatus, while heading the shutter body 25 side of the disk device 1. This insertion causes the guiding rib 19 disposed at the movement guiding member 20 of the disk driving apparatus to engage with the operational-position determining groove 17. When the guiding rib 19 engages with the operational-position determining groove 17, the guiding rib 19 is guided by the guiding portion 17A at the end portion of the operational-position determining groove 17. The guiding rib 19 is smoothly guided, since the tip end portion of the guiding rib 19 is formed into the converged shape by chamfering the tip ends of the guiding rib and in the substantially ellipse shape in the plan view. This allows the guiding rib 19 to assuredly engage with the operational-position determining groove 17 even when the disk device 1 is inserted in a slightly tilted manner, thereby allowing to duly position the disk device 1. Note, it is possible to avoid an erroneous insertion of the disk device 1, because the guiding rib 19 abuts onto the peripheral surface of the body case 11 when the disk device 1 was inserted into the insertion opening in an upside-down manner or a manner heading a portion other than the shutter body 25 side.

Further insertion of the disk device 1 in a forcible manner in a situation where the guiding rib 19 has engaged with the operational-position determining groove 17, causes the guiding rib 19 to relatively move within the operational-position determining groove 17 to thereby abut onto the rotation restricting portion 40C of the rotation regulator 40 as the disk device 1 is moved, thereby rotating the rotation regulator 40 against the restoring force of the torsion coil spring 43. Further movement of the disk device 1 in its inserting direction causes the rotation restricting portion 40C to abut onto the positioning convex portion 42 so that the rotation restricting portion 40C is deformed to yield against its elasticity as shown in FIG. 6(B). Further movement of the disk device 1 in its inserting direction causes the rotation restricting portion 40C to stride over the positioning convex portion 42. In this state, the rotating body 30 engages with the operation rack 45 of the movement guiding member 20 of the disk driving apparatus as shown in FIG. 4(A).

Movement of the disk device 1 in its inserting direction, in the state where the rotating body 30 engages with the operation rack 45, brings about a situation where the operation rack 45 relatively moves on the outer peripheral surface of the rotating body 30 correspondingly to the movement of the disk device 1, so that the rotating body 30 is rotated. This rotation of the rotating body 30 rotates the first pinion 36 and second pinion 37 of the transmission 35, so that the shutter body 25 having the shutter rack 27 engaged with the second pinion 37 is moved within the sliding recess 15 toward the rotating body 30 side. When the rotating body 30 is to be engaged with the operation rack 45 and to be rotated by the same, the guiding rib 19 prevents the disk device 1 from being moved in a faraway direction from the operation rack 45. Thus, the engaging state between the rotating body 30 and operation rack 45 can be assuredly maintained, so that the rotating body 30 is assuredly rotated by the operation rack 45 with the movement of the rotating body.

While the rotating body 30 is rotated and the shutter body 25 is moved by the insertion of the disk device 1, the guiding rib 19 further moves within the operational-position determining groove 17 relative thereto and passes through the rotation restricting portion 40C as shown in FIG. 6(C). The passage of the guiding rib 19 through the rotation restricting portion 40C causes the rotation regulator 40 to rotate by the restoring force of the torsion coil spring 43, so that the rotation restricting portion 40C again abuts onto the positioning convex portion 42 to thereby restrict the rotational movement of the rotation regulator 40. In this state, the rotation restricting pawl portion 40B of the rotation regulator 40 never engages with the rotating body 30, so that the rotation of the rotating body 30 by the operation rack 45 is maintained to thereby move the shutter body 25 with the insertion of the disk device 1.

As shown in FIG. 4(B), the disk device 1 having been moved to a predetermined position, i.e., the operational position for recording a piece of information and/or reproducing the recorded information, is brought into a state where the window 14 is fully opened to thereby expose the recording surface 5 and the periphery of axial hole 4 of the disk 2. Then, the rotation shaft (not shown) of the disk driving apparatus is inserted into the axial hole 4 of the disk device 1 and fixed thereto, so as to rotate the disk 2 by the rotation of the rotation shaft, thereby exemplarily conducting an operation for recording a piece of information and/or reproducing the information.

Figure 7A:
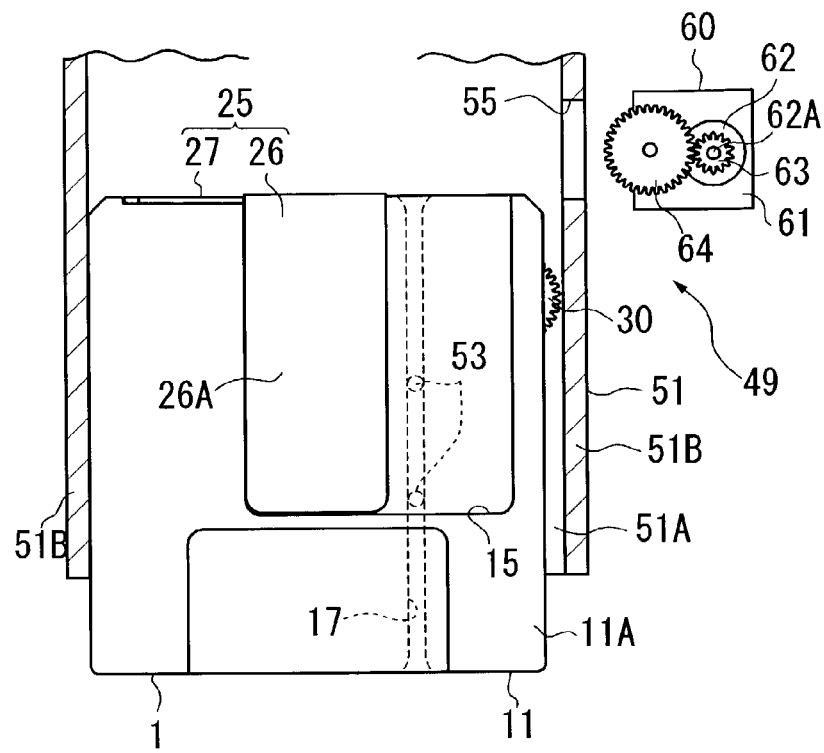
Figure 7B:
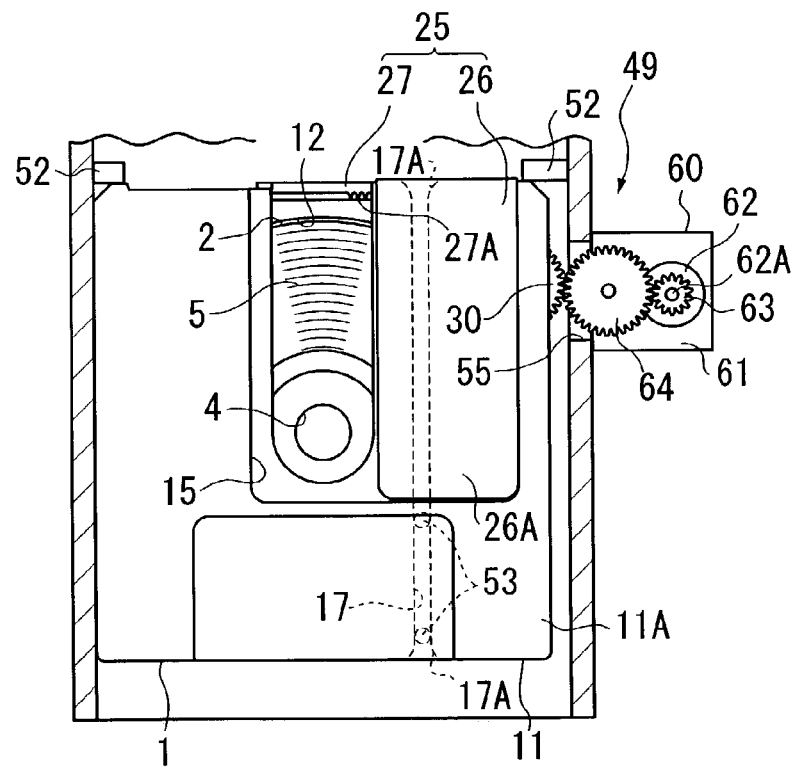

There will be explained hereinafter a situation for operating the disk device 1 in another disk driving apparatus. Such a disk driving apparatus exemplarily includes a constitution shown in FIGS. 7(A–B).

Namely, reference numeral 51 in FIGS. 7(A–B) designates a movement guiding member, and this movement guiding member 51 is formed into a substantially channel shapes cross section to include a carrying plate 51A and a pair of guiding rails 51B, in substantially the same shape as the movement guiding member 20 of the disk driving apparatus shown in FIG. 4 and FIG. 5.

The carrying plate 51A is provided with positioning ribs 52 protruded at the side of the moving direction of the disk device 1 so as to position the inserted disk device 1 at the operational position to thereby restrict the further movement of the disk device 1. The carrying plate 51A is protruded with a pair of guiding pins 53 engaged with the operational-position determining groove 17, instead of the singular elongated guiding rib 19 of the disk driving apparatus shown in FIGS. 4 and 5. These guiding pins 53 are protruded at positions deviated from the position corresponding to the sliding recess 15, in a state where the disk device 1 has been positioned by abutting onto the positioning ribs 52.

One of the guiding rails 51B is cut out and formed with a cut-out 55, instead of the operation rack 45 of the guiding rail 20B of the disk driving apparatus shown in FIGS. 4 and 5. This cut-out 55 is disposed at a position opposing to the rotating body 30 in a state where the disk device 1 has been positioned by abutting onto the positioning ribs 52.

The disk driving apparatus is provided with rotation driver 60 as the rotating structure. This rotation driver 60 includes a seat portion 61. This seat portion 61 is disposed within the disk driving apparatus in a manner capable of moving to and from, i.e., approaching and departing from a position adjacent to the movement guiding member 51 to thereby face to the cut-out 55.

The seat portion 61 is integrally provided with an electric motor 62 as driving source. This electric motor 62 has its output shaft 62A integrally provided with a driving gear 63. Further, rotatably pivoted to the seat portion 61 is a drive transmission gear 64 engaged with the driving gear 63. This drive transmission gear 64 can be rotatably pivoted in any means, identically with the rotating body 30.

When the disk device 1 is to be operated by the disk driving apparatus shown in FIGS. 7(A–B), the disk device 1 is inserted into the insertion opening (not shown) of the disk driving apparatus while heading the shutter body 25 side of the disk device, identically with the situation where the disk device is operated by the disk driving apparatus shown in FIGS. 4(A–B) and 5. This insertion causes the guiding pins 53 disposed on the movement guiding member 51 of the disk driving apparatus to be guided by and engaged with the guiding portion 17A of the operational-position determining groove 17, to thereby position the disk device 1.

Further insertion of the disk device 1 in a forcible manner in a situation where the guiding pins 53 have engaged with the operational-position determining groove 17, causes the guiding pins 53 to relatively move within the operational-position determining groove 17 to thereby rotate the rotation regulator 40 thereby terminating the rotation restriction of the rotating body 30, identically with the situation for operating the disk device by the disk driving apparatus shown in FIGS. 4(A–B) and 5.

Further movement of the disk device 1 in its inserting direction in the state where the rotation restriction of the rotating body 30 has been terminated, causes the disk device 1 to abut onto the positioning ribs 52 so that the further movement of the disk device is restricted and thus the disk device 1 is positioned. By recognizing this positioning such as by a sensor or switch, the rotation driver 60 is integrally moved to a position adjacent to the movement guiding member 51, so as to engage the drive transmission gear 64 with the rotating body 30 of the positioned disk device 1 facing to the cut-out 55. In this state, the electric motor 62 is driven to thereby rotate the driving gear 63 together with the output shaft 62A, so that the drive transmission gear 64 is rotated by the driving gear 63. This rotation of the drive transmission gear 64 rotates the rotating body 30 so that the shutter body 25 is moved to thereby open the window 14 thereby exposing the recording surface 5 of the disk 2, identically with the disk driving apparatus shown in FIGS. 4 and 5.

[Effect of Disk Device]

As described above, the above embodiment exhibits the following functions and effects.

Namely, the disk device 1 is provided by rotatably accommodating the disk 2 in the disk cartridge 3 in which the body case 11 capable of rotatably accommodating therein the disk 2 is opened with the windows 14 for exposing the recording surfaces 5 of the disk 2 recorded with the information and the shutter body 25 is provided in a manner capable of opening/closing the window 14. In a state where the disk device 1 has been loaded in the disk driving apparatus for recording a piece of information into and/or reproducing the information recorded in the disk 2 or in the course of moving the disk device 1 into the operational position, the rotating body 30 rotatably provided within the body case 11 in a state for exposing the outer peripheral surface of the rotating body is contacted with and rotated by the operation rack 45 of the movement guiding member 20 shown in FIGS. 4(A), 4(B) and 5 or the drive transmission gear 64 of the rotation driver 60 shown in FIGS. 7(A) and 7(B) so that the shutter body 25 is moved by rotation of the rotating body 30 by the shutter driver 35 disposed within the body case 11 to thereby open/close the window 14. This enables to open/close the window 14 even by the operation rack 45 and rotation driver 60 having mutually different constitutions by rotating the rotating body 30 to thereby move the shutter body 25 in the course of loading movement of the disk device into the disk driving apparatus or after the loading of the disk device, so that the constitution for opening/closing the shutter body 25 is not limited, thereby allowing to improve the versatility.

It is possible to rotate the rotating body 30 such as by contacting it with the operation rack 45 disposed on the wall surface or simply with the inner surface of the guiding rail 20B in the course of loading movement into the disk driving apparatus as shown in FIGS. 4(A–B) and 5, thereby readily downsizing and lightening the disk driving apparatus where the constitution for opening/closing the shutter body 25 is omitted from the disk driving apparatus or realized by the operation rack 45 of a simple structure.

Then, the gear shape of the rotating body 30 allows to readily utilize a general constitution adopting a rack and pinion constitution for converting the rotation of the rotating body 30 into the linear movement of the shutter body 25, to thereby simplify the constitution for opening/closing the shutter body 25, thereby allowing to readily improve the manufacturability and realize lightening and downsizing. Further, the rotating body 30 can be assuredly rotated such as by a gear or rack without slippage, thereby allowing to efficiently and assuredly open/close the shutter body 25.

In addition, the disk device 1 is provided by rotatably accommodating the disk 2 in the disk cartridge 3 in which the body case 11 capable of rotatably accommodating therein the disk 2 is opened with the windows 14 for exposing the recording surfaces 5 of the disk 2 recorded with the information and the shutter body 25 is provided in a manner capable of opening/closing the window 14. In a state where the disk device 1 has been loaded in the disk driving apparatus for recording a piece of information into and/or reproducing the information recorded in the disk 2 or in the course of moving the disk device 1 into the operational position, the rotating body 30 rotatably provided within the body case 11 in a state for exposing the outer peripheral surface of the rotating body is contacted with and rotated by the operation rack 45 of the movement guiding member 20 shown in FIGS. 4(A–B) and 5 or the drive transmission gear 64 of the rotation driver 60 shown in FIGS. 7(A–B) so that the shutter body 25 is moved by rotation of the rotating body 30 by the transmission 35 disposed within the body case 11 to thereby open/close the window 14. This enables to open/close the window 14 even by the operation rack 45 and rotation driver 60 having mutually different constitutions by rotating the rotating body 30 to thereby move the shutter body 25 in the course of loading movement of the disk device into the disk driving apparatus or after the loading of the disk device, so that the constitution for opening/closing the shutter body 25 is not limited, thereby allowing to improve the versatility.

There is provided the rotation regulator 40 for separably contacting with the rotating body 30 to thereby restrict the rotation of the rotating body 30. This assuredly avoids such a situation that the rotating body 30 is inadvertently rotated in a normal state to move the shutter body 25 thereby opening the window 14 to thereby expose the disk 2. Thus, the damage of the disk 2 can be assuredly prevented.

The rotation regulator 40 is disengaged from the rotating body 30: in the course of loading movement into the disk driving apparatus which utilizes the disk device 1; and in the state where the disk device 1 has been loaded in the disk driving apparatus. Thus, the rotation regulator 40 contacts with the rotating body 30 in a normal state to thereby avoid the movement of the shutter body 25 due to the rotation of the rotating body 30, while the rotation regulator 40 is separated from the rotating body 30 to thereby allow the rotating body 30 to rotate upon conducting the operation for recording/reproducing the information in the disk driving apparatus, thereby resulting in that the disk 2 is exposed only upon recording/reproducing the information thereby allowing to record/reproduce the information so that the disk 2 can be assuredly protected in the normal state.

Provided as the transmission 35 are: the shutter rack 27 integrally provided on the shutter body 25; the rotating body 30; and the first pinion 36 and second pinion 37 engaged with the rack 27A of the shutter rack 27 and rotated with the rotation of the rotating body 30. Thus, the first pinion 36 and second pinion 37 of the transmission 35 are rotated as the rotating body 30 is rotated upon loading the disk device 1 into the disk driving apparatus such that the rack 27A integrally provided on the shutter body 25 and engaged with the second pinion 37 is moved to thereby move the shutter body 25, thereby allowing to obtain a constitution for opening/closing the shutter body 25 by the rotation of the rotating body 30 by virtue of the simple structure to thereby readily downsize the disk device 1 and improve the manufacturability thereof.

Further, the rotating body 30 is constituted to be assuredly acted by the operating force while the guiding rib 19 or guiding pin 53 of the disk driving apparatus is protruded into the operational-position determining groove 17 disposed on the body case 11. This eliminates any protruded constitution of the disk device 1 to thereby promote the operability thereof, while allowing to exemplarily determine the inserting orientation of the disk device 1 in each disk driving apparatus, i.e., to avoid an erroneous insertion of the disk device 1 into the disk driving apparatus such as in an opposite or different orientation.

Further, the operational-position determining groove 17 is disposed at the position near the rotating body 30, thereby assuredly preventing the disk device 1 from moving in an escaping manner, as compared with a situation where the disk device 1 is duly positioned by the pair of guiding rails 20B of the movement guiding member 20 or 51 correspondingly to the width dimension of the body case 11 having a relatively large tolerance for dimension. This allows to obtain a state where the rotating body 30 is assuredly engaged such as with the operation rack 45 or rotation driver 60, so that the rotating body 30 is assuredly rotated to thereby allow to openingly/closingly move the shutter body 25 in a reliable manner. Namely, the location for positioning the disk device 1 in its readily escaping direction is closer to the cooperating guiding rail 20B, than the location of the remaining guiding rail 20B for otherwise positioning the disk device 11 in its readily escaping direction. This allows to reduce dispersion of moving distances in the escaping direction of the disk device 1, to thereby obtain a situation where the rotating body 30 is assuredly engaged with the rotating structure.

Figure 11:
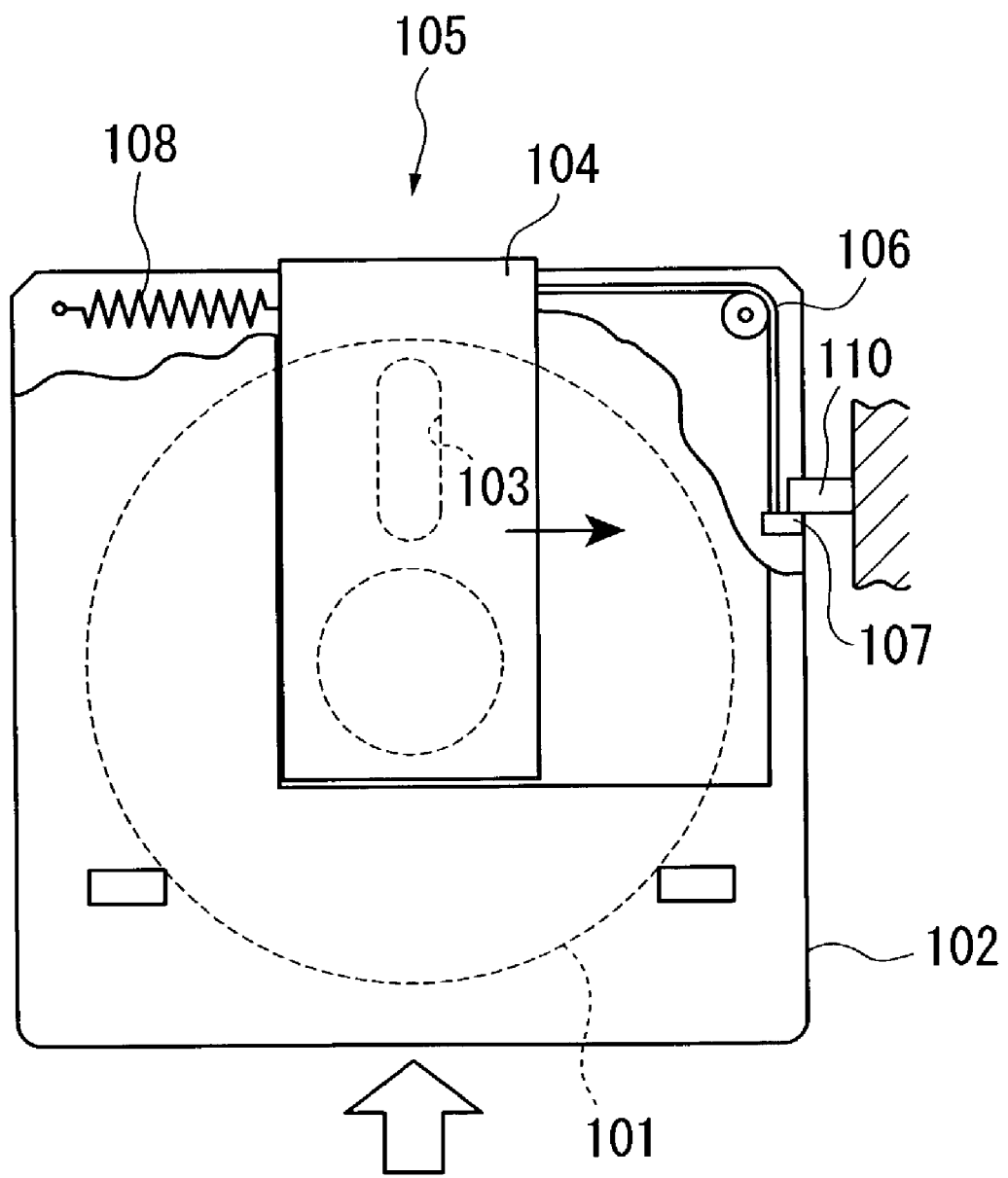
FIG. 11 is an explanatory view showing an operation for opening/closing a shutter of a conventional disk device.
Figure 12:
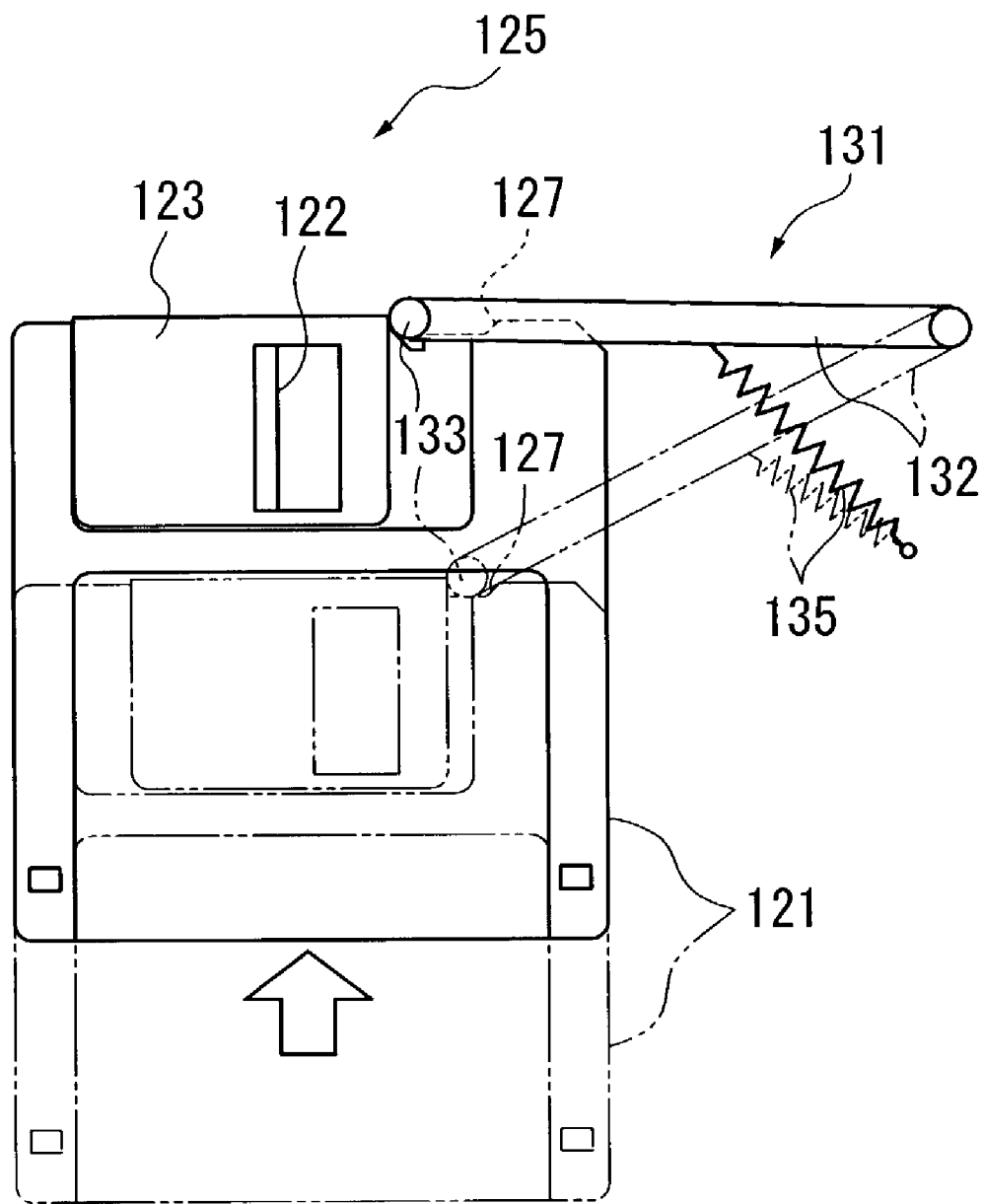
FIG. 12 is an explanatory view showing an operation for opening/closing a shutter of another conventional disk device.

Moreover, the rotation driver 60 disposed on the disk driving apparatus is disengageably contacted with the rotating body 30 and then rotated, thereby allowing to open/close the shutter body 25 having been loaded into the disk driving apparatus such as shown in FIGS. 7(A–B). Thus, unlike the conventional constitution exemplarily shown in FIGS. 11 and 12, the loading direction of the disk device 1 into the disk driving apparatus is never limited, such as by appropriately setting the arranged position and/or moving direction of the rotation driver 60, to thereby improve the versatility.

Meanwhile, the rotating body 30 is engaged with the operation rack 45 disposed in the disk driving apparatus and is rotated by the movement of the disk device upon loading the disk device 1 into the disk driving apparatus. This allows to open/close the shutter body 25 by the simple constitution of the fixed operation rack 45 without providing the disk driving apparatus with any specific constitution for opening/closing the shutter body 25, thereby allowing to readily downsize the disk driving apparatus.

[Variation of Embodiment]

The present invention is not limited to the aforementioned embodiment, and embraces variations within a scope capable of achieving the object of the present invention.

Namely, the disk device 1 of the present invention is applicable to any disk 2 capable of reproducing and/or recording a piece of information.

Further, the disk device 1 is not limited to accommodate the disk 2 therein, and is utilized as the disk cartridge 3 for removably accommodating the disk 2.

The rotation regulator 40 is not limited to the constitution for engaging its rotation restricting pawl portion 40B with the rotating body 30 to thereby restrict the rotation of the rotating body. Namely, the rotation regulator may include any constitution for restricting the rotation such as by pressure-contacting, and may be even omitted.

Although the rotating body 30 has been operatively used as the shutter driver 48, the constitution of the latter is not limited thereto and can be achieved by any suitable constitution. Nonetheless, in case of providing a constitution such as the rotating body 30 to be rotated by an engagement of a gear or by pressure-contact to thereby move the shutter 26 by this rotation such that the constitution is provided at a side surface of the body case 11 in the moving direction of the body case 11, the rotating structure is rendered to laterally engage or pressure-contact with the rotating body so that the body case together with the rotating body particularly tends to be laterally forced in an escaping manner thereby tending to fail to obtain a sufficient rotation of the rotating body, which sufficient rotation is to be inherently provided by the inserting movement of the body case or disk device. Thus, in case of adopting the rotating body 30, it is preferable to engage the seizing structure with the engaging structure provided near the rotating body 30 constituting the shutter driver 48.

In the above, the engaging structure is constituted of the operational-position determining groove 17 in a concave shape, and the seizing structure is constituted of the guiding rib 19 or guiding pins 53. However, it is possible to adopt a concave-convex reversed constitution such that the body case 11 is protruded with the guiding rib 19 or guiding pins 53 while the movement guiding member 20 or 51 is provided with the operational-position determining groove 17 to be engaged by the guiding rib 19 or guiding pins 53. Further, the concave and convex may be in any suitable shapes capable of engaging with and disengaging from each other to thereby conduct positioning. For example, in a situation where the shutter 26 is opened/closed after loading into the operational position of the disk driving apparatus, it is possible to adopt a suitable concave shape capable of positioning, without limited to a grooved shape elongated in the moving direction. Moreover, in case of adopting such a concave and convex constitution for positioning, the constitution need not be disposed near the rotating body 30 and may be disposed at any suitable position to allow the positioning in a more reliable manner than the conventional.

Figure 8:
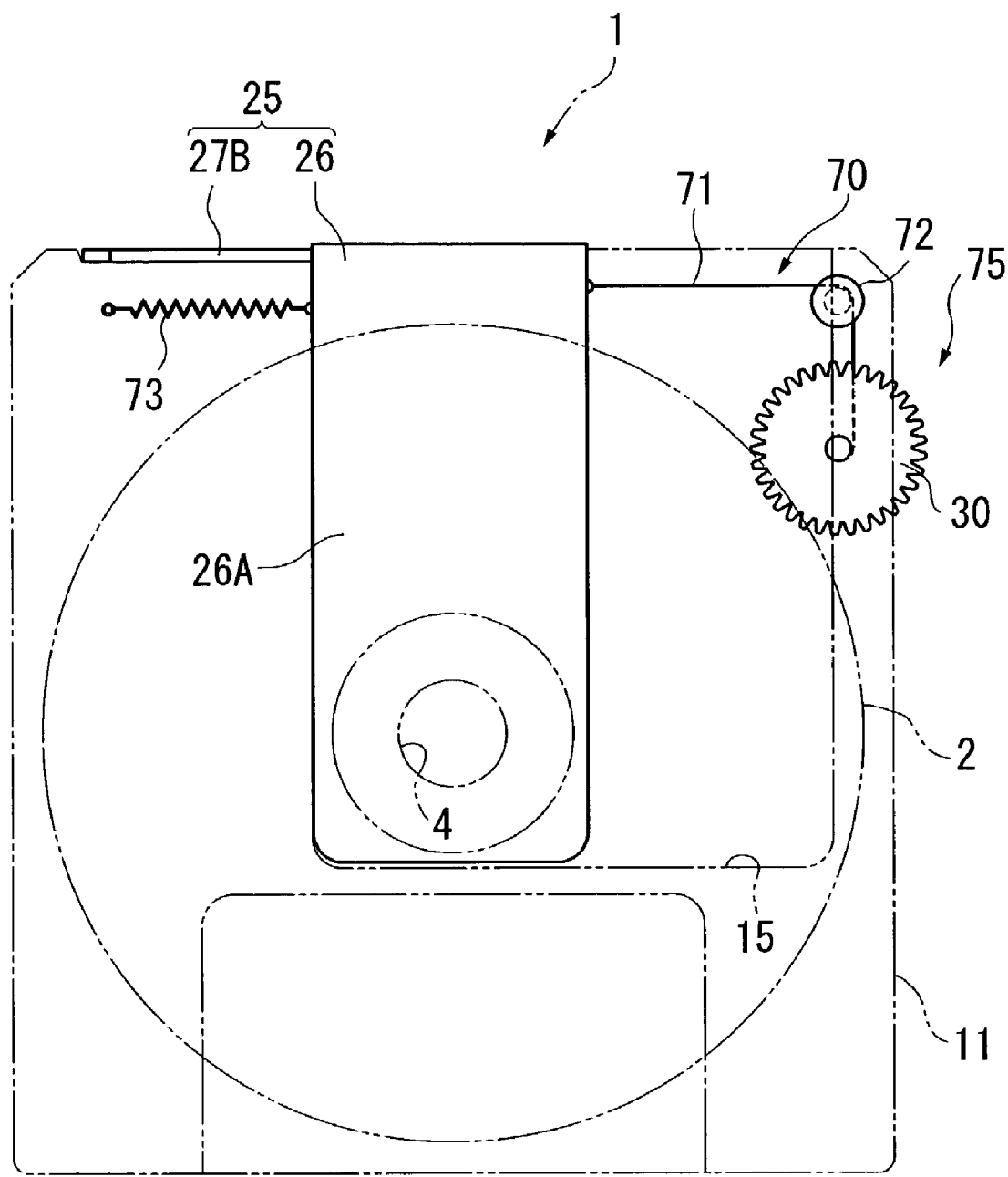
FIG. 8 is a plan view showing a partially removed constitution of a disk device according to another embodiment of the present invention.

The transmission 35 constituting the shutter driver 48 is not limited to the first pinion 36 and second pinion 37, and may be realized by a constitution such as shown in FIG. 8. Namely, FIG. 8 shows transmission 70 including a string member 71 having one end coupled to the shutter 26 and the other end coupled to the rotation shaft 30B of the rotating body 30 acting as wind-up structure. This string member 71 is wound around a pulley 72 positioned in the moving direction of the shutter body 25 within the body case 11 and disposed in a rotatable manner. Provided at the opposite side to the extending direction of the string member 71 is a coil spring 73 as counteracting structure. This coil spring 73 is provided in a state for influencing a pulling force as a restoring force onto the shutter 26 of the shutter body 25 so as to bring it into a normally closed state. The rotating body 30, transmission 70 and shutter rack 27 cooperatively constitute shutter driver 75.

Figure 9:
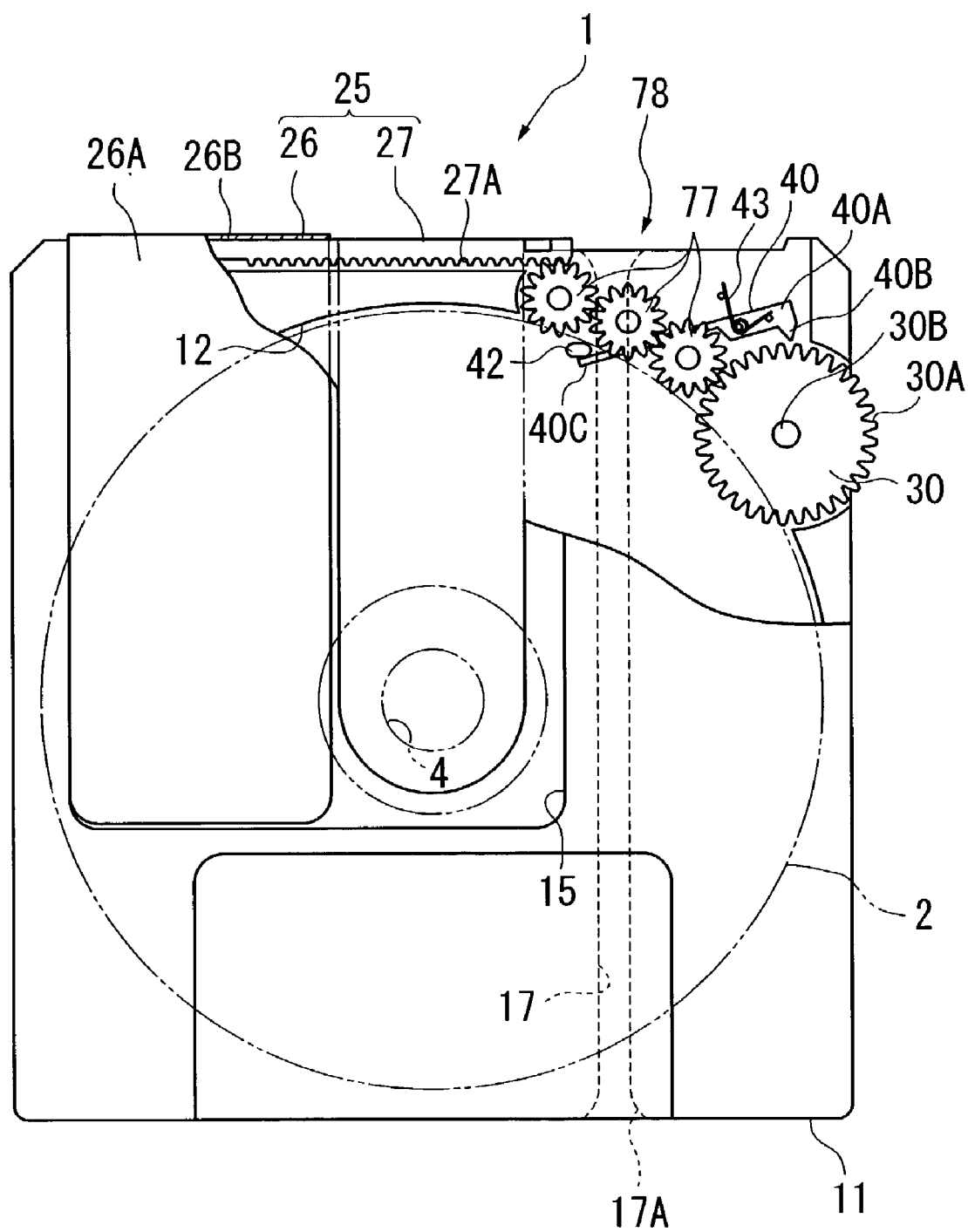
FIG. 9 is a plan view showing a partially cut-away constitution of a disk device according to yet another embodiment of the present invention.

Further, the shutter driver may be achieved: by exemplarily adopting a plurality of pinions 77 as shown in FIG. 9 such that three pinions 77 constitute shutter driver 78 for moving the shutter body 25 into the opposite or faraway direction by transmitting the rotation of the rotating body 30 to the shutter rack 27 via pinions 77; by moving the shutter body by adopting pulleys and an endless belt; or by moving the shutter body by combining these pulleys and endless belt with the pinions 77.

It is not limited to adopt the guiding rib 19 and guiding pins 53 such as in the shape of rib and pin, respectively, and it is possible to adopt members in any shape including a wall shape capable of positioning or to provide a plurality of members like the guiding pins 53.

Further, the transmission constituting the shutter driver may be achieved: by exemplarily adopting a plurality of pinions 77 as shown in FIG. 9 such that three pinions 77 constitute shutter driver 78 for moving the shutter body 25 into the opposite or faraway direction by transmitting the rotation of the rotating body 30 to the shutter rack 27 via pinions 77; by moving the shutter body by adopting pulleys and an endless belt; or by moving the shutter body by combining these pulleys and endless belt with the pinions 77.

The outer peripheral surface of the rotating body 30 has been provided to be protruded and exposed from the outer edge of the body case 11. However, it is possible to provide the rotating body 30 in a state exemplarily shown in FIG. 10 by providing protector 81 for covering the rotating body 30 in an axial direction such that the rotating body 30 is not protruded beyond the outer edge of the body case 11 but the outer peripheral surface of the rotating body 30 is exposed to the exterior.

Figure 10:
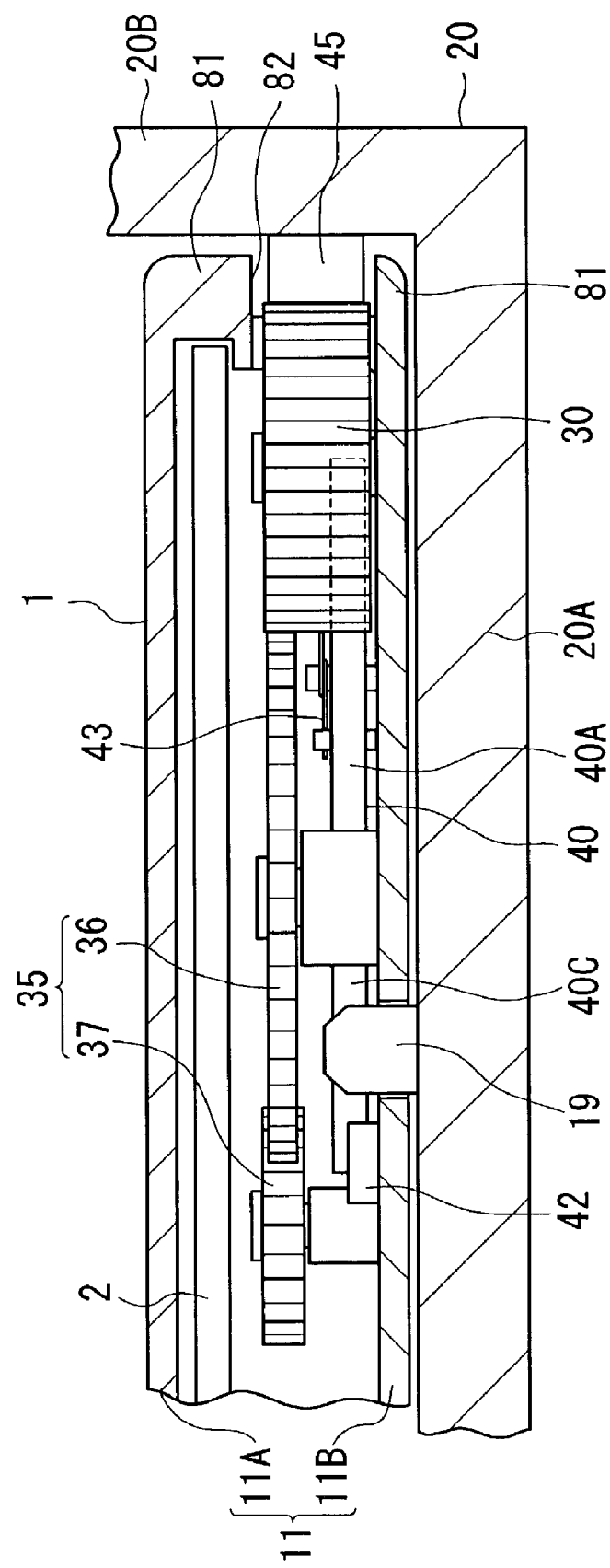
FIG. 10 is a plan view showing a partially cut-away constitution of a disk device according to still another embodiment of the present invention.

Namely, as shown in FIG. 10, the body case 11 is provided with a recessed portion 82 in a shape of recessed groove along the length of its one side surface in the inserting direction of the body case 11. The rotating body 30 is provided in a state where the outer peripheral surface of the rotating body is not protruded beyond the edge portion of the recessed portion 82 but positioned within the recessed portion 82. In this state, the side wall portions defining the recessed portion 82 serve as the protector 81. The operation rack 45 is formed to have a width dimension capable of moving within the recessed portion 82. Upon insertion into the disk driving apparatus, the operation rack 45 is brought into a state for relatively moving within the recessed portion 82 so that the operation rack 45 engages with the rotating body 30 to thereby rotate the same, thereby opening/closing the window 14 by the shutter body 25.

The constitution shown in FIG. 10 allows: to avoid inadvertent contact with the rotating body 30 from the exterior such as by hand; to avoid an inadvertent rotation and damage of the rotating body 30; and to restrict the rotation of the rotating body 30 by a simple structure even without providing a specific constitution such as the rotation regulator 40. Further, the rotating body 30 is not protruded, thereby allowing to improve the external appearance. Note, the recessed portion 82 is not restricted to the constitution to be provided over the entire length of the one side surface of the body case 11. Namely, the recessed portion may be limited to only that area where the rotating body 30 is located, when the rotation driver 60 is exclusively utilized as the rotating structure of the disk driving apparatus without adopting the operation rack 45. In such a situation, the protector constituted of the recessed portion 82 may be also limited to only that area where the rotating body 30 is located.

The disk driving apparatus maybe achieved by any suitable constitution such as by directly loading or placing the disk device 1 onto an operational position without providing the movement guiding members 20, 51, or by plurally providing the movement guiding members 20, 51.

Although the operational-position determining groove 17 has been explained to be provided, it is not impossible to omit it. Nonetheless, in case that the rotating body 30 is rotated such as by engagement of a gear or by pressure-contact to thereby move the shutter 26 by this rotation such that the rotating body 30 is provided at a side surface of the body case 11 in the moving direction of the body case 11, the rotating structure is rendered to laterally engage or pressure-contact with the rotating body so that the body case together with the rotating body particularly tends to be laterally forced in an escaping manner thereby tending to fail to obtain a sufficient rotation of the rotating body, which sufficient rotation is to be inherently provided by the inserting movement of the body case or disk device. Thus, in case of adopting the rotating body 30, it is preferable to engage the guiding rib 19 or guiding pin 53 with the operational-position determining groove 17 particularly provided near the rotating body 30.

The operational-position determining groove 17 and the guiding rib 19 and guiding pin 53 have been provided in the body case 11 and movement guiding members 20, 51, respectively. However, it is possible to adopt an exchanged or reverse constitution, and the concave and convex may be in any suitable shapes capable of engaging with and disengaging from each other to thereby conduct positioning. Further, the positioning constitution may be achieved such as by positioning the disk device 1 between the guiding rails 20B of the movement guiding member 20, without providing the disk device 1 with a specific constitution such as the operational-position determining groove 17.

In addition, the concrete structure and procedures such as upon practicing the present invention may be modified or altered to other ones insofar as the object of the present invention is achieved.

What is claimed is:

1. A disk cartridge for rotatably accommodating therein a disk so as to be loaded into a disk driving apparatus for conducting at least one of operations for recording a piece of information into the disk and reproducing the information recorded in the disk, said disk cartridge comprising:

a body case capable of rotatably accommodating the disk therein;

a window opened in said body case so as to expose that surface of the accommodated disk which is to be recorded with the piece of information;

a shutter provided in said body case in a manner capable of opening/closing said window;

shutter driver moveably disposed within said body case having an engaging portion to be engaged with an engaged portion on the disk driving apparatus in a state where said disk cartridge is loaded in the disk driving apparatus or in the course of loading movement of said disk cartridge into the disk driving apparatus, so as to move said shutter to thereby open/close said window;

a first guide provided in a convex or concave shape on an outer surface of said body case, the first guide being adapted to engage with a second guide provided on the disk driving apparatus; and a shutter regulator disposed within said body case, the shutter regulator restricting the movement of said shutter by disengageably engaging with said shutter driver and being released from the engagement with said shutter driver by being contacted by the disk driving apparatus while the engaging portion of said shutter driver contacts with the engaged portion on the disk driving apparatus.

2. A disk cartridge according to claim 1, wherein said first guide is formed in a concave shape to be disengageably engaged by said second guide protrudedly provided in a convex shape on the disk driving apparatus.

3. A disk device comprising:
a disk cartridge recited in claim 2; and
a disk rotatably accommodated within said disk cartridge.

4. A disk cartridge according to claim 1, wherein the engaging portion of said shutter driver contacts with the engaged portion on the disk driving apparatus to thereby move said shutter in the course of loading movement of said disk cartridge into the disk driving apparatus; and
wherein said first guide is formed in a recessed groove shape along the moving direction of said disk cartridge in the course of loading movement of said disk cartridge into the disk driving apparatus, in a manner engageable with said second guide protruded in that moving region of the disk driving apparatus which said body case is moved along.

5. A disk device comprising:
a disk cartridge recited in claim 4; and
a disk rotatably accommodated within said disk cartridge.

6. A disk device comprising:
a disk cartridge recited in claim 1; and
a disk rotatably accommodated within said disk cartridge.

7. A shutter opening/closing mechanism for opening/closing a shutter of a disk cartridge, the disk cartridge comprising: a body case accommodating a disk therein or capable of rotatably accommodating a disk therein; a window opened in the body case so as to expose that surface of the accommodated disk which is to be recorded with a piece of information; and the shutter provided in the body case in a manner capable of opening/closing the window; said shutter opening/closing mechanism comprising:
shutter driver moveably disposed within said body case having an engaging portion to be engaged with an engaged portion on a disk driving apparatus in a state where the disk cartridge is loaded in the disk driving apparatus or in the course of loading movement of the disk cartridge into the disk driving apparatus so as to move the shutter to thereby open/close the window;
a first guide provided in a convex or concave shape on an outer surface of the body case;
a second guide provided in a concave or convex shape in the disk driving apparatus so as to be engaged with said first guide while said shutter driver contacts with the disk driving apparatus; and
a shutter regulator disposed within said body case, the shutter regulator restricting the movement of said shutter by disengageably engaging with said shutter driver and being released from the engagement with said shutter driver by being contacted by the disk driving apparatus while the engaging portion of said shutter driver contacts with the engaged portion on the disk driving apparatus.

8. A shutter opening/closing mechanism according to claim 7,
wherein said second guide is protrudedly formed in a convex shape; and
wherein said first guide is formed in a concave shape to be disengageably engaged by said second guide.

9. A shutter opening/closing mechanism according to claim 7,
wherein the engaging portion of said shutter driver contacts with the engaged portion on the disk driving apparatus to thereby move the shutter in the course of loading movement of the disk cartridge into the disk driving apparatus;
wherein said second guide is protruded in a convex shape in that moving region of the disk driving apparatus which the body case is moved along; and
wherein said first guide is formed in a recessed groove shape along the moving direction of the disk cartridge in the course of loading movement of the disk cartridge into the disk driving apparatus, in a manner being disengageably engaged by said second guide.

* * * * *